(12) United States Patent
Cardno

(10) Patent No.: US 9,418,456 B2
(45) Date of Patent: Aug. 16, 2016

(54) DATA VISUALIZATION SYSTEM AND METHOD

(71) Applicant: New BIS Safe Luxco S.à r.l, Luxembourg (LU)

(72) Inventor: Andrew John Cardno, San Diego, CA (US)

(73) Assignee: New BIS Safe Luxco S.à r.l, Luxembourg (LU)

( * ) Notice: Subject to any disclaimer, the term of this patent is extended or adjusted under 35 U.S.C. 154(b) by 220 days.

(21) Appl. No.: 13/965,915

(22) Filed: Aug. 13, 2013

(65) Prior Publication Data

US 2014/0043337 A1 Feb. 13, 2014

Related U.S. Application Data

(63) Continuation of application No. 13/000,315, filed as application No. PCT/NZ2009/000110 on Jun. 18, 2009, now Pat. No. 9,058,695, application No. 13/965,915, which is a continuation-in-part of (Continued)

(51) Int. Cl.
*G06F 3/048* (2013.01)
*G06T 11/20* (2006.01)
*G06F 17/30* (2006.01)

(52) U.S. Cl.
CPC ........ *G06T 11/206* (2013.01); *G06F 17/30994* (2013.01)

(58) Field of Classification Search
None
See application file for complete search history.

(56) References Cited

U.S. PATENT DOCUMENTS

| 5,708,767 A | 1/1998 | Yeo et al. |
| 5,761,647 A | 6/1998 | Boushy |
| 5,832,182 A | 11/1998 | Zhang et al. |

(Continued)

FOREIGN PATENT DOCUMENTS

| WO | WO 03/089084 | 10/2003 |
| WO | WO 2004/068300 | 8/2004 |

(Continued)

OTHER PUBLICATIONS

Barbec et al. "Visualizing and Animating R-trees and Spatial Operations in Spatial Databases on the Worldwide Web." *Visual Database Systems 4 (VBD4).* 1998. pp. 147-153.

(Continued)

*Primary Examiner* — Stephen Alvesteffer
(74) *Attorney, Agent, or Firm* — Merchant & Gould P.C.

(57) ABSTRACT

A data visualization system comprising: a data retrieval module arranged to retrieve data from a data storage module in communication with the data visualization system, wherein the retrieved data includes data sets for representation in a tree map; a tree map generation module arranged to generate a tree map based on the retrieved data, wherein the tree map generation module is further arranged to: i) sort the retrieved data sets according to the size of the data sets; ii) define an area for generating multiple rectangles, each rectangle representing one of the data sets, wherein the area is defined to allow the data sets to be spatially arranged within the area; iii) accumulate data points for data within the data sets to generate a rectangle that has dimensions that fall within pre-defined parameters; iv) generate a rectangle for each data set; and v) orientate the rectangle such that its orientation is only changed if the rectangle does not fit in the available area.

30 Claims, 20 Drawing Sheets

Related U.S. Application Data application No. 13/000,320, filed as application No. PCT/NZ2009/000109 on Jun. 18, 2009.

(60) Provisional application No. 61/682,498, filed on Aug. 13, 2012, provisional application No. 61/074,347, filed on Jun. 20, 2008, provisional application No. 61/115,036, filed on Nov. 15, 2008, provisional application No. 61/140,556, filed on Dec. 23, 2008.

(56) References Cited

U.S. PATENT DOCUMENTS

| | | |
|---|---|---|
| 6,347,318 B1 | 2/2002 | Rokicki |
| 6,463,400 B1 | 10/2002 | Barkley-Yeung |
| 6,499,026 B1 | 12/2002 | Rivette et al. |
| 6,583,794 B1 * | 6/2003 | Wattenberg ............ 715/708 |
| 6,871,194 B1 | 3/2005 | Cardno |
| 6,888,543 B2 | 5/2005 | Ingber et al. |
| 7,333,998 B2 | 2/2008 | Heckerman et al. |
| 7,340,678 B2 * | 3/2008 | Chiu et al. ............ 715/734 |
| 2002/0138461 A1 | 9/2002 | Sinclair et al. |
| 2002/0193981 A1 | 12/2002 | Keung et al. |
| 2003/0158846 A1 * | 8/2003 | Ikehata et al. ............ 707/7 |
| 2003/0200191 A1 | 10/2003 | Pao et al. |
| 2004/0181554 A1 | 9/2004 | Heckerman et al. |
| 2005/0060329 A1 | 3/2005 | Watanabe et al. |
| 2007/0060830 A1 | 3/2007 | Le et al. |
| 2007/0087834 A1 | 4/2007 | Moser et al. |
| 2007/0097965 A1 | 5/2007 | Qiao et al. |
| 2008/0059872 A1 | 3/2008 | Tseng et al. |
| 2008/0071843 A1 | 3/2008 | Papadimitriou et al. |
| 2008/0140644 A1 | 6/2008 | Franks et al. |
| 2009/0287991 A1 | 11/2009 | Nakamura et al. |

FOREIGN PATENT DOCUMENTS

| | | |
|---|---|---|
| WO | WO 2006/138502 | 12/2006 |
| WO | WO 2007/033005 | 3/2007 |

OTHER PUBLICATIONS

Brabec et al. "The VASCO R-tree JAVA Applet." *Visual Database Systems 4* (*VBD4*). 1998. pp. 123-140.

Entropía; "Más tiempo;" Date Accessed: Jan. 31, 2008; http://www.luispabon.com/entropia/index.php?entry=entry071129-145959.

Few, Stephen; from white paper "BizViz: The Power of Visual Business Intelligence;" Mar. 7, 2006; www.perceptualedge.com.

Gilbert, Cheryl, et. al.; SearchCIO—Midmarket; "IIOP;" Date Accessed: Jan. 30, 2008; http://searchcio-midmarket.techtarget.com/sDefinition/0,,sid183_gci214019,00.html.

Google; Google Maps; "KML Gallery: Explore the Earth on Google;" Date Accessed: Jan. 30, 2008; http://earth.google.com/gallery/.

Guttman. "R-Trees: A Dynamic Index Structure for Spatial Searching." *ACM SIGMOD International Conference on Management of Data*. 1984. pp. 47-57.

IBM; WebSphere Product pp.; "WebSphere software;" Date Accessed: Jan. 30, 2008; http://www-306.ibm.com/software/websphere/?pgel=ibmhzn&cm_re=masthead-_-products-_-sw-websphere.

Information Aesthetics; "travel time maps;" Date Accessed: Jan. 31, 2008; http://infosthetics.com/archives/locative/.

Kimball, Ralph; "A Dimensional Modeling Manifesto;" Date Accessed: Apr. 10, 2008; http://www.dbmsmag.com/9708d15.html.

Nasdaq; "Nasdaq-100 Dynamic Heatmap;" Date Accessed: Jun. 10, 2008; http://screening.nasdaq.com/heatmaps/heatmap_100.asp.

Paris Technologies, Inc.; "OLAP;" Date Accessed: Jan. 30, 2008; http://www.olap.com.

Sam's Publishing; developer.com Gamelan™; "Introduction to EJB's;" http://www.developer.com/java/ejb/article.php/1434371, Jul. 29, 2002.

Six Sigma; "Subject Matter Expert—SME;" Date Accessed: Jan. 30, 2008; http://www.isixsigma.com/dictionary/Subject_Matter_Expert_-_SME-396.htm.

Weather.com; Date Accessed: Jan. 31, 2008; http://weather.com/.

Wikipedia; "Agile Software Development;" Date Accessed: Jan. 30, 2008; http://en.wikipedia.org/wiki/Agile_software_development.

Wikipedia; "Dimensional Modeling;" Date Accessed: Apr. 10, 2008; http://en.wikipedia.org/wiki/Dimensional_modeling.

Wikipedia; "Heat map;" Date Accessed: Jun. 10, 2008; http://en.wikipedia.org/wiki/Heat_map.

Wikipedia; "Mean down time;" Date Accessed: Jan. 30, 2008; http://en.wikipedia.org/wiki/Mean_down_time.

Wikipedia; "Mean time between failures;" Date Accessed: Jan. 30, 2008; http://en.wikipedia.org/wiki/Mean_time_between_failures.

Wikipedia; "Mean time to recovery;" Date Accessed: Jan. 30, 2008; http://en.wikipedia.org/wiki/Mean_time_to_recovery.

Wikipedia; "Planogram;" Date Accessed: Jan. 30, 2008; http://en.wikipedia.org/wiki/Planogram.

Wikipedia; "Self-organizing map;" Date Accessed: Jan. 30, 2008; http://en.wikipedia.org/wiki/Self-organizing_map.

Wikipedia; "Software as a Service;" Date Accessed: Jan. 30, 2008; http://en.wikipedia.org/wiki/Software_as_a_Service.

Wikipedia; "Voronoi Diagram;" Date Accessed: Jan. 31, 2008; http://en.wikipedia.org/wiki/Voronoi_diagram.

Zeiger, Stefan; "Servlet Essentials," Version 1.3.6, Nov. 4, 1999; Date Accessed: Jan. 30, 2008; http://www.novocode.com/doc/servlet-essentials/.

* cited by examiner

DATA VISUALIZATION SYSTEM AND METHOD

This application claims benefit of U.S. Provisional Ser. No. 61/682,498, filed 13 Aug. 2012. This application is a Continuation-in-Part of U.S. Ser. No. 13/000,315 filed 20 Dec. 2010, which is a National Stage of PCT/NZ2009/000110 filed 18 Jun. 2009, which claims benefit of U.S. Provisional Ser. Nos. 61/074,347 filed 20 Jun. 2008, 61/115,036 filed 15 Nov. 2008 and 61/140,556 filed 23 Dec. 2008. This application is a Continuation-in-Part of U.S. Ser. No. 13/000,320 filed 20 Dec. 2010, which is a National Stage of PCT/NZ2009/000109 filed 18 Jun. 2009, which claims benefit of U.S. Provisional Ser. Nos. 61/074,347 filed 20 Jun. 2008, 61/115,036 filed 15 Nov. 2008 and 61/140,556 filed 23 Dec. 2008. All applications are incorporated herein by reference. To the extent appropriate, a claim of priority is made to each of the above disclosed applications.

FIELD OF THE INVENTION

The present invention relates to a data visualization system and method. In particular, the present invention relates to a data visualization system and method that generates tree map representations.

BACKGROUND

A chart or graph is described in Wikipedia as a type of information graphic or graphic organizer that represents tabular numeric data and/or functions. Charts are often used to make it easier to understand large quantities of data and the relationship between different parts of the data. Charts can usually be read more quickly than the raw data that they come from. They are used in a wide variety of fields, and can be created by hand (often on graph paper) or by computer using a charting application.

Traditional charts use well established and often poorly implemented ways of representing data. Many tools exist to help the user construct very sophisticated representations of data but that sophistication typically results in less meaningful charts. Embodiments of the present invention aim to overcome this problem.

It is known to use charting wizards such as those that are available in Excel and various other systems such as those provided by, for example, IBM. In addition there are multiple Business Intelligence (BI) tools available to users to enable users to analyze data in an attempt to create meaningful feedback. However, as the amount of data increases, so does the complexity of the visual representations created by the analysis of the data. These complex representations can end up swamping parts of the visual representation that is most required and relevant to an end user.

Further, the focus of existing known methods of graphically representing data is on providing a single visual design, or type of visual or graphical representation, to represent data. That is, to produce, for example, a single bar graph to be displayed, or a single pie chart to be printed. This is very limiting to a user who may want to show various different aspects of the data in a single document.

Indexing methodologies, such as R-tree indexing for example, are used in conjunction with databases to categorize data and place the data in a hierarchical format. It is known to use self organizing maps to visually represent data. However, self organizing maps can be very difficult and arduous to interpret. Also, it has not previously been known to use the indexing methodologies, in particular the R-tree indexing, as a display mechanism on its own. Further, no weight has been placed on how nodes in a tree are positioned relative to other nodes other than by the mere child parent relationship.

Tree maps are a form of data visualization used to represent large amounts of data within data sets in a manner that enables users to easily understand the relationships between those data sets. For example, a tree map is able to easily distinguish between large and small data sets based on a number of different parameters selected by a user.

Standard mechanisms for generating tree maps are particularly computer intensive. This is because data sets are required to fit within a predefined data visualization area and the data values within the data sets being represented may not necessarily correlate with that defined area.

An object of the present invention is to provide an improved method and/or system that generates tree map visualizations, or to at least provide the public with a useful choice.

The present invention aims to overcome, or at least alleviate, some or all of the afore-mentioned problems.

Further objects and advantages of the invention will be brought out in the following portions of the specification, wherein the detailed description is for the purpose of fully disclosing the preferred embodiment of the invention without placing limitations thereon.

The background discussion (including any potential prior art) is not to be taken as an admission of the common general knowledge.

SUMMARY OF THE INVENTION

Various concepts are herein disclosed as set out in the claims at the end of the specification.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e. they will be taken to mean an inclusion of the listed components that the use directly references, but optionally also the inclusion of other non-specified components or elements.

According to one aspect, the present invention provides a data visualization system comprising: a data retrieval module arranged to retrieve data from a data storage module in communication with the data visualization system, wherein the retrieved data includes data sets for representation in a tree map; a tree map generation module arranged to generate a tree map based on the retrieved data, wherein the tree map generation module is further arranged to: i) sort the retrieved data sets according to the size of the data sets; ii) define an area for generating multiple rectangles, each rectangle representing one of the data sets, wherein the area is defined to allow the data sets to be spatially arranged within the area; iii) accumulate data points for data within the data sets to generate a rectangle that has dimensions that fall within pre-defined parameters; iv) generate a rectangle for each data set; and v) orientate the rectangle such that its orientation is only changed if the rectangle does not fit in the available area.

According to a further aspect, the present invention provides a data visualization computer implemented method comprising the steps of a processor: retrieving data from a data storage module in communication with a data visualization system, wherein the retrieved data includes data sets for representation in a tree map; generating a tree map based on the retrieved data, wherein the tree map generation further comprises the steps of: i) sorting the retrieved data sets according to the size of the data sets; ii) defining an area for generating multiple rectangles, each rectangle representing one of the data sets, wherein the area is defined to allow the data sets to be spatially arranged within the area; iii) accumulating data points for data within the data sets to generate a rectangle that has dimensions that fall within pre-defined parameters; iv) generating a rectangle for each data set; and v) orientating the rectangle such that its orientation is only changed if the rectangle does not fit in the available area.

BRIEF DESCRIPTION OF THE DRAWINGS

Embodiments of the present invention will now be described, by way of example only, with reference to the accompanying drawings, in which:

FIG. 1A shows a NASDAQ Heat Map Example;

Figure 1A:
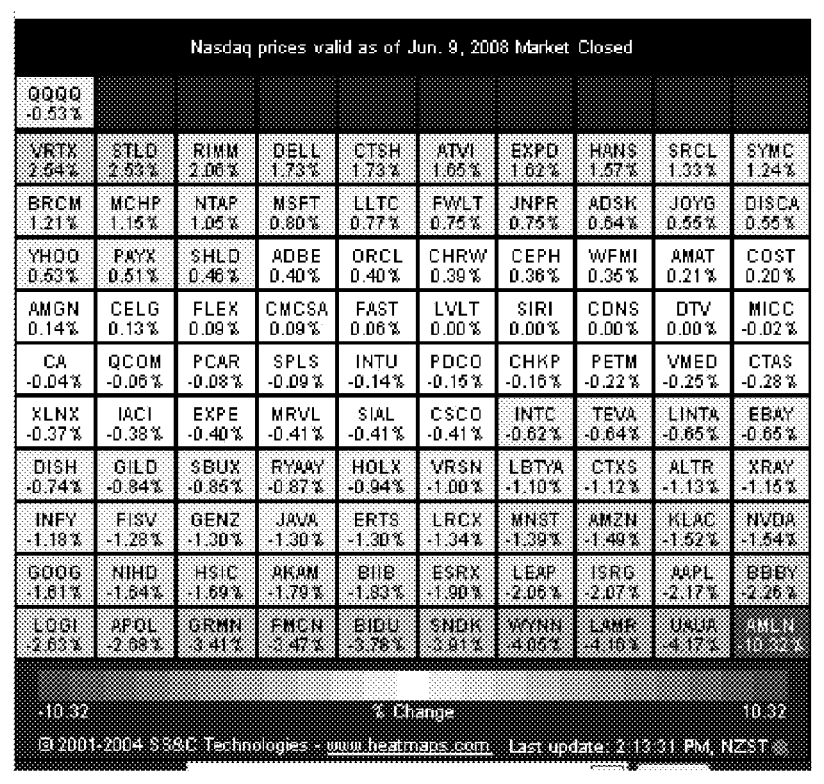
Figure 1B:
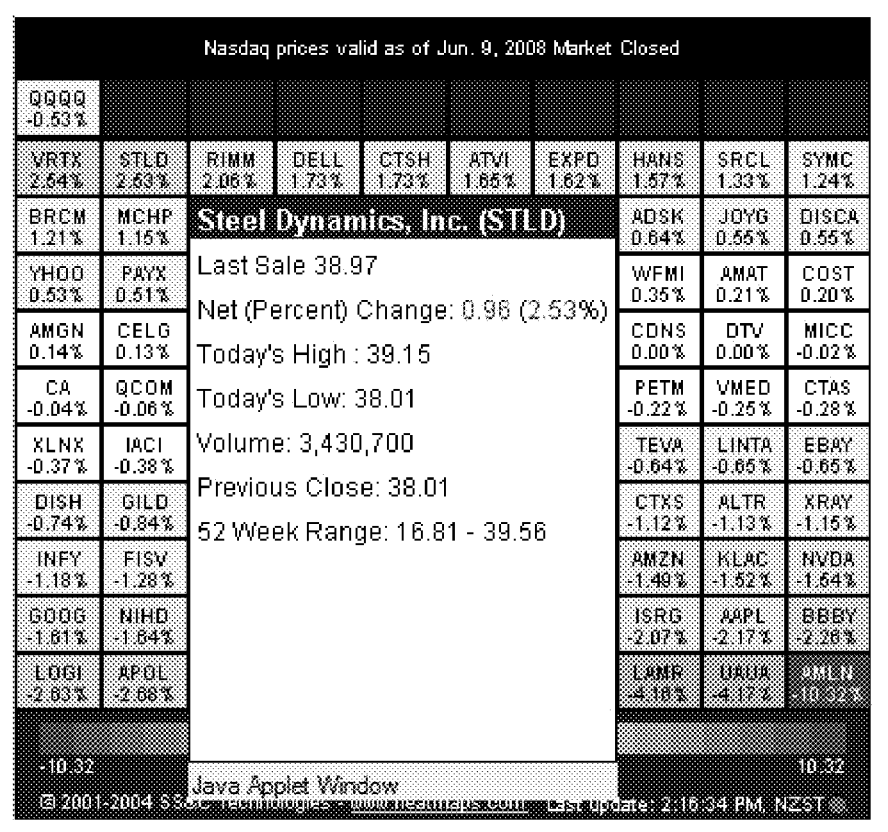

FIG. 1B shows a NASDAQ Heat Map Intra Day Data Example;

DETAILED DESCRIPTION OF THE INVENTION

Figure 1C:
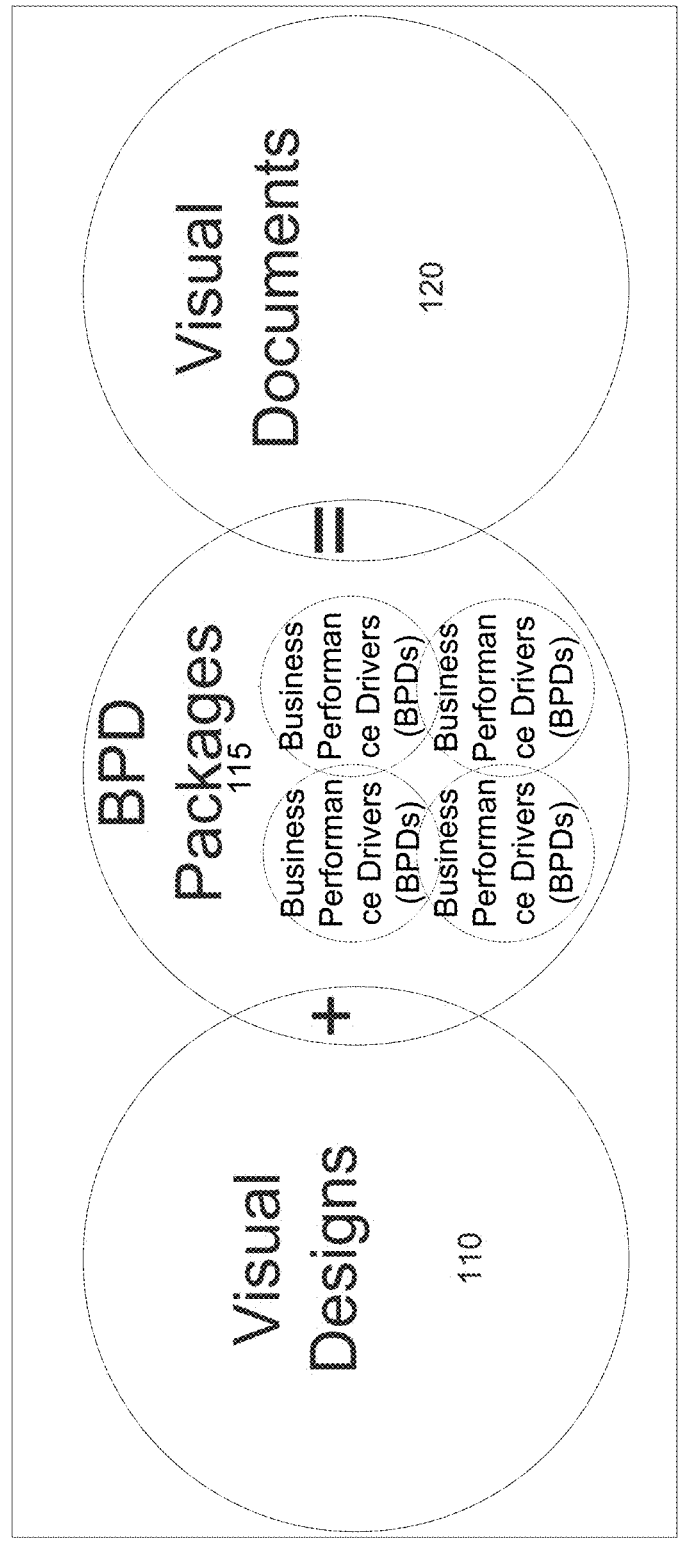
FIG. 1C shows a diagrammatical representation of some key terms.

The following described invention is suitable for use in conjunction with other methods, and the incorporation into one or more systems, for example as described in METHODS, APPARATUS AND SYSTEMS FOR DATA VISUALISATION AND RELATED APPLICATIONS (earlier filed by the applicant in the entirety as U.S. provisional patent application Ser. No. 61/074,347 filed on 20 Jun. 2008), which is incorporated by reference, and a portion of which herein follows.

Four key terms (or concepts) form the foundation of the specification set out in this document and accordingly have been defined as follows:

The four key terms are:
Business Performance Drivers (BPD)
BPD Packages
Visual Designs
Visual Documents The key terms are defined as follows:

Business Performance Drivers (BPDs): A Business Performance Driver (BPD) is a business metric used to quantify a business objective. For example, turnover, sales. BPDs are Facts (sometimes referred to as measures). Facts are data items that can be counted. For example, Gross Sales; Units Sold. BPDs comprise of:

1. Measures: Data items that can be counted. For example, Gross Sales; Units Sold.
2. Dimensions: Data items that can be categorized. For example, Gender; Locations.
3. Restrictions can be applied to BPDs. These filter the data included. For example a restriction of 'State="CA"' may be specified to only include data for California.
4. Normalizations can be applied to BPDs. These specify (or alter) the time period the BPD refers to. For example—Daily Units Sold, Monthly Profit.

The combination of BPDs, Restrictions and Normalizations provides the flexibility to create many ways of looking at data without requiring extensive definition effort.

In other words a Business Performance Driver (BPD) is a 'measure' that can be normalized. Measures are data items that can be counted. For example, Gross Sales; Units Sold. BPDs might be displayed on visualizations. For example, Revenue earned per store on a map. Restrictions and/or Normalizations could be applied to a BPD. The following table provides examples of these:

| Scenario | Business Example |
| --- | --- |
| BPD (no normalization or restriction) | Revenue |
| BPD with restriction | Revenue earned in the state of California |
| BPD with normalization | Revenue earned in week 1 of 2008 |
| BPD with restriction and normalization | Revenue earned in the state of California in week 1 of 2008 |

BPD Packages: A BPD Package is made up from a set of related BPDs. This relationship (between a BPD Package and its BPDs) is defined using metadata. BPD Packages can be thought of as the Visual Document's vocabulary.

Visual Designs: Visual Designs are a classification of the different types of visualizations that a user may choose. Within each Visual Design, there are a number of visualizations. For example, the 'spatial' category can have retail store location maps or geographical location maps. The software solution allows users to select one visualization (one visual form within a Visual Design category) to create a Visual Document.

Visual Document: A Visual Document contains visual representations of data. Access to the data used to construct the visual representation is in many ways analogous to a textual document. A Visual Document is constructed by applying BPD data to a specific Visual Design. It is designed to illustrate at least one specific point (using the visualization), supports the points made with empirical evidence, and may be extended to provide recommendations based on the points made. The Visual Document is a deliverable to the user.

| | | | |
|---|---|---|---|
| Dimensions | Dimensions are data items that can be categorized. For example, Gender; Locations. Dimensions might be displayed on visualizations. For example product categories on a shop floor. | | |
| Fact | See Business Performance Drivers (BPDs) | | |
| Measure | See Business Performance Drivers (BPDs) | | |
| Normalizations | Can be applied to BPDs. These specify (or alter) the time period the BPD refers to. For example - Daily Units Sold, Monthly Profit. The combination of BPDs, Restrictions and Normalizations provides the flexibility to create many ways of looking at data without requiring extensive definition effort. Refer to definition of BPDs for examples. | | |
| Restrictions | Can be applied to BPDs or Dimensions. These filter the data included. For example a restriction of 'State = "CA"' may be specified to only include data for California. A BPD or Dimension could be restricted by Compound Statements (series of restrictions using AND/OR statements). For example, Revenue from all stores where state = California AND units sold >200 units. Restrictions have the following types: | | |

| Restriction Type | Definition | Example | Business Context |
|---|---|---|---|
| = | Equal to | State = 'CA' | Revenue earned within the state of California |
| >= | Greater than or equal to | Units Sold >= 200 | Revenue earned from stores where units sold were greater than (or equal to) 200 units |
| =< | Less than or equal to | Revenue =< $50,000 | Revenue earned from stores where Revenue was less than (or equal to) $50,000 |
| > | Greater than | Units Sold > 200 | Revenue earned from stores where the number of units sold were greater than 200 units |
| < | Less than | Units Sold < 200 | Revenue earned from stores where the number of units sold were less than 200 units |
| IN | In (list) | State IN ('CA', 'NY') | Revenue earned from stores within the states of California and New York |
| BETWEEN | Values between X and Y | Product Code between '124' and '256' | Revenue earned from product codes 124 to 256 (inclusive) |
| NOT = | Not Equal to | State NOT = CA | Revenue earned from stores outside the state of California. |
| NOT IN | Not in (list) | State NOT IN ('CA', 'NY') | Revenue earned from outside the states of California and New York. |
| NOT BETWEEN | Values not between X and Y | Store Code NOT Between 105 and 110 | Revenue earned from stores excluding stores with a store code between 105 and 110 (inclusive). |

Heatmaps: A heat map is a graphical representation of data where the values taken by a variable in a two-dimensional map are represented as colors. A very similar presentation form is a Tree map.

Heat maps are typically used in Molecular Biology to represent the level of expression of many genes across a number of comparable samples (e.g. cells in different states, samples from different patients) as they are obtained from DNA microarrays.

Heat maps are also used in places where the data is volatile and representation of this data as a heat map improves usability. For example, NASDAQ uses heat maps to show the NASDAQ-100 index volatility. Source: Wikipedia This is shown diagrammatically in FIG. 1A. Some blocks are colored green, which means the stock price is up and some blocks are colored red, which means the stock price is down. The blocks have a varying deepening of the relevant color to indicate the direction that the stock is moving. The deeper the color, the bigger the move.

If a user hovers over a stock, additional intra-day data is presented—as shown in FIG. 1B: Source: Nasdaq.com The key terms are set out diagrammatically in FIG. 1C. Visual designs 110 are individual visualization techniques. One or more are applied to visualize BPD packages 115 to create visual documents 120.

Many organizations are facing massive and increasing amounts of data to interpret, the need to make more complex decisions faster, and accordingly are turning to data visualization as a tool for transforming their data into a competitive advantage. This is particularly true for high-performance companies, but it also extends to any organization whose intellectual property exists in massive, growing data sets.

One objective of the described solution is to put experts' data visualization techniques in the customer's hands by skillfully guiding the end user through choosing the right parameters, to display the right data, and to create its most useful visualizations to improve business performance.

The described solution is a generic tool and can apply to multiple business areas that require decisions based on and understanding massive amounts of data. The resulting browser-based output is defined as a 'Visual Document'.

Figure 2A:
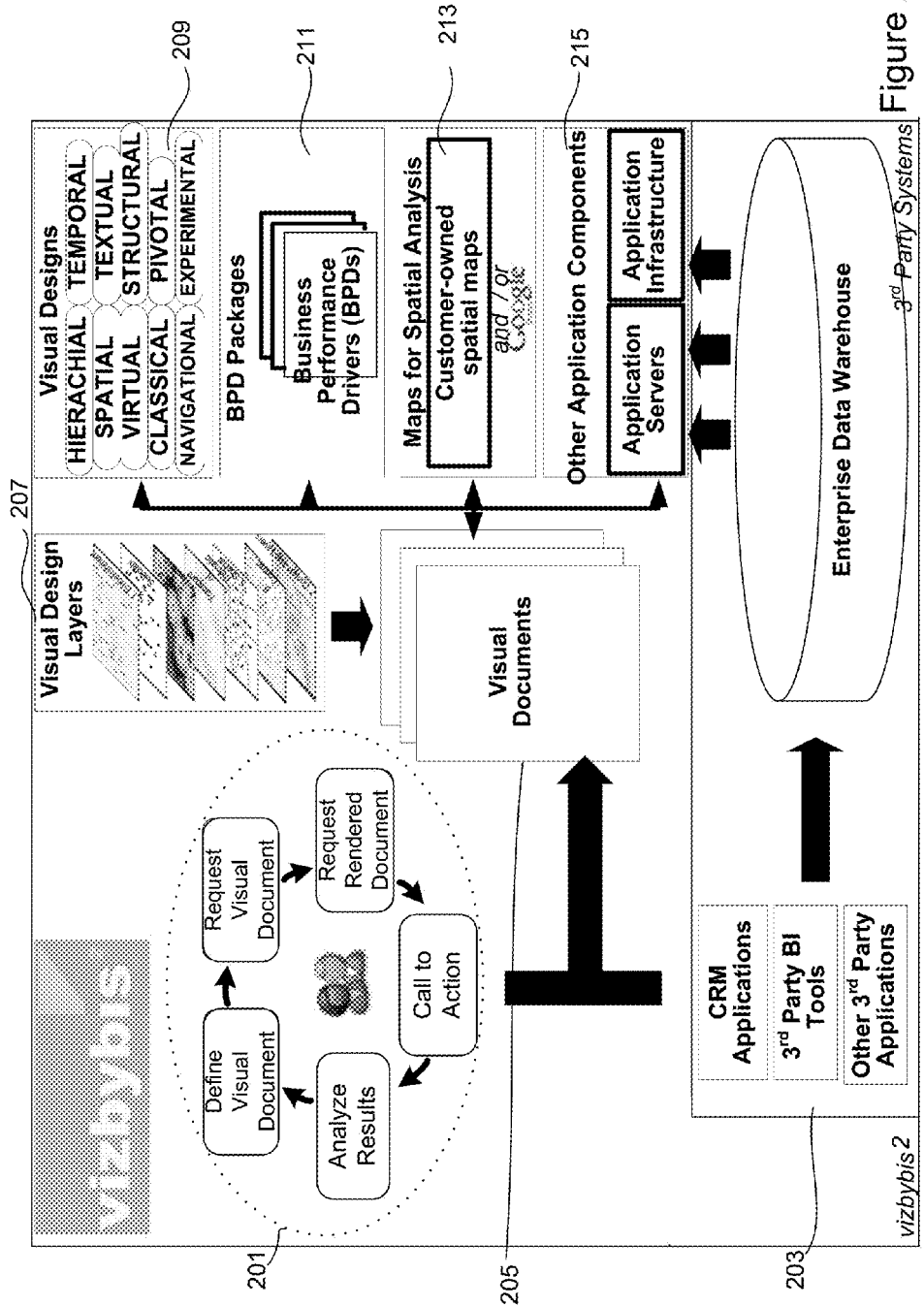
FIG. 2A shows a system concept diagram according to an embodiment of the present invention.

The solution provided is summarized in FIG. 2A.

The system identifies user tasks 201 in the form of defining visual documents, requesting visual documents, requesting rendered documents, calls to action, and analyzing results. These tasks are then detected by the system in conjunction with other systems 203, which include CRM applications, third party Business Intelligence (BI) Tools and other third party applications, all of which may access data stored in an enterprise data warehouse (EDW). The visual design layer concept 207 may be utilized within the visual documents 205. The creation of the visual documents is made in conjunction with a number of different defined visual design types 209, BPD packages 211, spatial analysis maps 213 and other application components 215, such as application servers and application infrastructure.

A Visual Document contains visual representations of data. Access to the data used to construct the visual representation is in many ways analogous to a textual document. It is constructed by applying Business Performance Driver(s) (BPD) data to a specific Visual Design (Visual Designs are grouped into ten classifications).

A Visual Document is designed to illustrate at least one specific point (using the visualization), support the points made with empirical evidence, and may be extended to provide recommendations based on the points made. The Visual Document is the actual deliverable from the software to the software user. Visual Documents may be stored, distributed or analyzed later, as needed.

The Visual Document is fed by data and a metadata database that stores definitions of BPDs—the BPDs are the focus of the Visual Document. A Business Performance Driver is a business metric used to quantify a business objective. Examples include, gross sales or units sold. For instance, the Visual Document may be used to graphically depict the relationship between several BPDs over time.

In the Visual Document, data is rendered in up to seven layers in one embodiment. However, it will be understood that the number of layers may be varied as needed by the user. Specific Visual Document Layers are described herein. However, it will be understood that further Visual Document Layers may be included over and above the specific types described.

Visual Designs are explicit techniques that facilitate analysis by quickly communicating sets of data (termed BPD Packages) related to BPDs. Once constructed, Visual Documents may be utilized to feed other systems within the enterprise (e.g., Customer Relationship Management (CRM) systems), or directly generate calls to action.

The described solution utilizes the best available technical underpinnings, tools, products and methods to actualize the availability of expert content.

At its foundation, the solution queries data from a high performance enterprise data warehouse characterized by parallel processing. This database can support both homogeneous (identical) and heterogeneous (differing but intersecting) databases. The system is adaptable for use with a plurality of third party database vendors.

A scalable advanced web server framework can be employed to provide the necessary services to run the application and deliver output over the web.

A flexible and controllable graphics rendering engine can be used to maximize the quality and speed levels required to support both static and dynamic (which could be, for example, animated GIF, AVI or MPEG) displays. All components can operate with a robust operating system platform and within secure network architecture.

Pre-existing (and readily available) third party components can be employed to manage user security (e.g. operating system security), industry specific applications and OLAP (Online Analytical Processing) or other more traditional reporting. The described solution is designed to facilitate speedy and reliable interfaces to these products.

A predictive modeling interface assists the user in analyzing forecasted outcomes and in 'what if' analysis.

Strict security, testing, change and version control, and documentation standards can govern the development methodology.

Many organizations are facing massive and increasing amounts of data to interpret, the need to make more complex decisions faster, and accordingly are turning to data visualization as a tool for transforming their data into a competitive advantage. This is particularly true for high-performance companies, but it also extends to any organization whose intellectual property exists in massive, growing data sets.

This clash of (a) more data, (b) the increased complexity of decisions and (c) the need for faster decisions was recently recognized in an IDC White Paper (Gantz, John et. al.; IDC White Paper; "Taming Information Chaos: A State-of-the-Art Report on the Use of Business Intelligence for Decision Making" November 2007), which described this clash as the "Perfect Storm" and that this 'storm' will drive companies to make a quantum leap in their use of and sophistication in analytics.

Today's business tools and the way they operate barely allow business users to cope with historical internal data, let alone internal real time, predictive, and external data.

Hence, a new paradigm in business intelligence solutions is required.

System Overview

As explained above, FIG. 2A shows a high-level overview of the system.

There are five key components to the system. These are:
1. Visual Documents;
2. Visual Designs;
3. Business Performance Drivers (and BPD Packages);
4. Spatial Maps;
5. Application Components.

A description of each of these components is set out below under the respective headings.

Visual Documents

The Visual Documents form the core of the solution from a user perspective. This may include visualization(s), associated data and/or metadata (typically the visual form) that the user defines requests and interacts with. The Visual Documents may consist of single frames or animated frames (which could be, for example, implemented in AVI, GIF or MPEG format or a sequence of still images).

The Visual Document is typically viewed in a dynamic web browser view. In this interactive view the user may observe, select and navigate around the document.

Once created, the Visual Documents may be stored in the database and may be distributed to key persons (printed, emailed etc.) or stored for later use and analysis.

Visual Designs

The Visual Designs are a classification of the different types of visualizations that a user may choose. Within each Visual Design category, there are a number of visualizations. For example, the 'spatial' category can have retail store location maps, network maps or geographical location maps, such as, for example, maps available from Google™ or Yahoo™.

The described system allows users to select one or more visualizations (e.g. one visual form within a Visual Design category) to create a Visual Document.

There are ten Visual Design categories defined below, however it will be understood that further Visual Designs are envisaged, as well as the number of visualizations within each classification and the number of classifications.

Visual Designs are a classification of the different types of visualizations that a user may choose. Within each Visual Design, there are a number of visualizations.

For example, the 'spatial' category can have retail store location maps or geographical location maps.

The visual design types include:
Hierarchical
Temporal
Spatial
Textual
Virtual
Structural
Classical
Pivotal
Navigational
Interactive 1. Hierarchical Visual Designs One purpose of a hierarchical visual design is to present large scale hierarchical data in one display. It is a picture for understanding, monitoring, exploring and analyzing hierarchical data.

Key elements of hierarchical visual designs are:
Data is hierarchical.
Structure of data can determine hierarchy.
They can be overlaid with connections.

This type of visualization may be automatically generated from a table of contents. This automatically generated hierarchy then becomes a special layer over which specific information can be overlaid.

The Hierarchical Visual Design is a hierarchical diagram such as an organizational chart or a correlation matrix.

This Visual Design has at least one natural centre and typically has a higher density toward the fringes of the visualization. The Hierarchical Visual Design can typically be considered as a 'tree' structure. The nodes and vertices within the tree structure are best if they are generated automatically from a dataset. This tree structure is a good example of a Special Layer.

The development process will include building a tree that is optimized for this type of Visual Design including heat mapping techniques.

Large scale hierarchical data is represented using various techniques such as mapping to icons, shapes, colors and heights.

Typical uses include mapping of web pages, organizational charts, decision trees and menu options.

2. Temporal Visual Designs

One purpose of a temporal visual design is to present temporal based data, such as, for example, revenue per day, in a specially designed calendar or time series view. This calendar view will enable users to view thematic layers that display BPD information such as revenue or sales.

This type of visual design is a completely data defined Visual Design. The key input values are typically 'start' and 'end' dates along with the 'number' of variables to be displayed.

The simplest, and potentially the most useful, Visual Design Special Layer may be a carefully drawn calendar. The calendar may then become a useful Visual Design for date-based Visual Documents.

Temporal analysis is one of the fundamental methods of almost all analysis. Using temporal high density visualizations, users will be able to overlay high density Thematic Layers on well designed Special Layers such as the spiral data visualization shown in the above examples. This analysis can be applied in everything from customer frequency and spend analysis to analysis of the impacts of time of day on the management of a mobile phone network.

It is considered that temporal design patterns are particularly important in terms of analytics as the majority of analytics are time based. Described herein are several examples of producing temporal visual designs.

Non Contiguous Time—For example, weekends can be represented in some interesting ways. The simplest way being not to show them.

Non-linear Time—This allows multiple years of history to be shown where the oldest data is spatially compressed in the Visual Design.

Temporal Special Layers—These can be used to compare quite disjointed types of data. For example, the relationship between external public events, operational payroll sizes and sales revenue. There exists no easy way to numerically join this data together, visually this data can be joined. The technique combines well with simple correlations as it is possible to combine these distinct datasets to show correlations.

Control—One important consideration in visualizing temporal data is the gaining of scientific control. For example, seasonal variables. This is particularly interesting as one year is always different from the next. Quite simply, the start date of each year is never the same as the next, and moving external events such as Easter and 'acts of God' such as weather make precise comparison very difficult.

3. Spatial Visual Designs

One purpose of a spatial visual design is to present an overview of large scale numerical data in one spatial display (i.e. a space) for understanding, monitoring and analyzing the data in relation to a space.

This type of visual design combines together base maps provided by third parties with rendered thematic layers. These "mash-ups" are user definable and accessible to users.

For example, third party base maps may include customer-owned spatial maps or readily available base maps such as those provided by Google™ Maps or Yahoo™ Maps. The system provides powerful thematic layers over one of these spatial base maps.

One example of a spatial visual design is available at www.weather.com. This map shows two layers—(1) an underlying heat map overlaid with (2) actual temperature at specific cities. The points are useful as the state boundaries allow the user to determine with relative ease which city is being referenced. The underlying heat map is useful as it allows the user to see the overall trend at a glance.

A second example is available at Information Aesthetics. This example shows the travel time from the centre of London outwards using various methods of travel. The use of heat maps here shows very clearly the relationship between distance from the centre of London and travel time.

In a further example, the 'spatial' category of visual design can have retail store location maps, network maps or geographical location maps, such as, for example, maps available from Google™ or Yahoo™.

Numerical data may be independently mapped using parameters such as hue, saturation, brightness, opacity and size distributed across a defined geographical space.

Geographic mapping has a wide range of uses. In fact with the wide availability of high quality base maps, the world is becoming spatially enabled. Mapping applications can be used for a huge variety of tasks, from customer relationship management to drive time analysis, site selection to insurance risk analysis and telecommunications network analysis.

4. Textual Visual Designs

One purpose of textual visual designs is to enable business users to interact and query seamlessly from the structured to the unstructured world.

While it is possible to do basic numeric analysis on variables such as hit frequency and number of clicks per hour, the key method is to use a special layer to construct a sensible schematic of the unstructured data then overlay BPDs. Simply put, the described solution will leverage information visualization to bring structure to the unstructured world.

For example, a heat map may be used as part of a textual visual design.

Unstructured textual information is a huge area of growth in data storage and intuitively, the business intelligence industry expects this data to become a valuable asset. The described solution provides information visualization capabilities that overlay and draw out the non-numeric, but actionable, observations relating to unstructured data, in order to link the numeric data warehouse to the unstructured world.

There are a multitude of Special Layers that may be used with textual data. These textual Special Layers extend from building self organizing maps of textual information to diagrams showing the syntax hierarchy of the words used in a document.

A self organizing map (SOM) consists of components called nodes or neurons. Associated with each node is a weight vector of the same dimension as the input data vectors and a position in the map space. The usual arrangement of nodes is a regular spacing in a hexagonal or rectangular grid. The self-organizing map describes a mapping from a higher dimensional input space to a lower dimensional map space. The procedure for placing a vector from data space onto the map is to find the node with the closest weight vector to the vector taken from data space and to assign the map coordinates of this node to our vector—Source: Wikipedia.

5. Virtual Visual Designs

One example of a virtual visual design is a 3D representation of a virtual environment. 3D worlds generate far more accurate and complete data than the real world. As these 3D worlds grow in popularity and become more immersive, the potential for business intelligence tools to be applied to this environment grows significantly.

One example application of the use of a virtual visual design is a retail space analysis tool where transaction data is under-laid as the color of the carpet or shelves. In the case of the shelves, the shelves can also show representations of the products on the shelves.

6. Structural Visual Designs

One purpose of a structural visualization is to illustrate the structure of the data. For example, network topology or interconnection between data elements. The interconnections in the examples below show how a simple Special Layer construct can be used to illustrate quite complex connections.

One example of a structural type visual representation is that of the London underground map. The London underground map is a key historic map showing the schematic topology of the London underground. Using this map travelers can intuitively plan out complex routes and interconnects. Without this visualization, navigating the London underground system would be significantly more difficult and complex to understand.

These structural visualizations are very powerful and are closely related to spatial visualizations. Most of the thematic treatments that can be applied to a spatial visualization are equally applicable to a structural visualization.

Examples of uses for such a visual design type would be for visualizing call routing across a network, electricity grid management and route optimization.

It will be understood that a wide variety of Special Layers may be created in this space. These Special Layers essentially generate the structural schematic from the base data.

Typically the interconnections between nodes are used to generate the structure. One important aspect of the structural Special Layer is building the structure in such a way that interconnect line crossing is minimized.

7. Classical Visual Designs

Traditional charts provide a simple, common and well-established way of presenting data using classical visual designs. However, traditional charts are user-skill dependent and the herein described system may be used to apply guided Visual Design techniques to traditional charts to significantly extend their usefulness.

One example would be to show a line chart of Speed Vs Time in a simple two dimensional line graph. This type of basic graph shows the data clearly and allows the user to observe any geometric trends.

Some common charts that fall into this design category are as follows:
  Scatterplots—Are Cartesian coordinates to show the relation of two or more quantitative variables.
  Histograms—Typically show the quantity of points that fall within various numeric ranges (or bins).
  Bar graphs—Use bars to show frequencies or values for different categories.
  Pie charts—Show percentage values as a slice of a pie.
  Line charts—Are a two-dimensional scatterplot of ordered observations where the observations are connected following their order.

8. Pivotal or Quartal Visual Designs

Different visualization methods have been suggested for high-dimensional data. Most of these methods use latent variables (such as principal components) to reduce the dimensionality of the data to 2 or 3 before plotting the data. One problem with this approach is that the latent variables sometimes are hard to understand in terms of the original variables.

The parallel coordinate (PC) scheme due to Inselberg and others attempts to plot multivariate data in a completely different manner. Since plotting more than 3 orthogonal axis is impossible, parallel coordinate schemes plot all the axes parallel to each other in a plane. Squashing the space in this manner does not destroy too much of the geometric structure. The geometric structure is however projected in such a fashion that most geometric intuition has to be relearned, this is a significant drawback, particularly for visualization of business data.

Pivotal or Quartal visual designs allow the user to display higher dimensional data in a lower dimensional plot by ranking and splitting variables across various axes. This method may for example be used to display 3D data in a 2D plot.

9. Navigational Visual Design

Navigational visualizations use a highly visual interface to navigate through data while maintaining the general context of the data. This data visualization method may use other visual design types so it is differentiated more by the style of how it is used than the implementation standard.

Photosynth for example is a powerful navigational tool for moving between images, its display is designed for navigation of large numbers of linked images.

One illustrative navigational representation example is shown by Ubrowser. This navigational visualization example shows web pages represented in a geometry design. The web pages can be navigated through by spinning the cube shown in the example.

Navigational visualizations are designed for users to interactively move through the data. The objective of the visualization is to present a large volume of data in such a way as to enable users to move through the information and gain an understanding of how the data links together.

A number of display techniques are known for displaying information with regard to a reference image (the combination referred to as primary information). Where the limit of primary information is reached a user may wish to know more but be unable to further explore relevant information. A user may also simply wish to explore other aspects although there is more primary information to explore.

A key element of navigational visual designs is that they are interactive and are designed to assist in data navigation and data way-finding rather than for analytical purposes.

10. Interactive Visual Designs

This classification is for significantly advanced or interactive visual designs which do not fit within the preceding classifications.

These visualizations vary in nature from pure abstract forms to more tangible forms of visualizations. The key difference is that these visualizations may not be classified within the preceding Visual Design classifications due to their advanced nature or interactivity.

Any Visual Design layer considerations will be dependent on the interaction being considered.

There is opportunity to use common associations to provide iconic views of key events; the common associations are created using the interactive tools and asking users for feedback on the relevant icons. This feedback is then developed into a learned interactive system to provide iconic data representations.

Eye movement sensors can be used to control the interactivity and to learn information about relevant icon usage and control interactivity.

A wide range of user interfaces are used in conjunction with computer systems. Generally these are simply used to provide command or data inputs rather than to analyze the underlying behavior of a user in the context of the operation of a software application.

It would be desirable to operate software applications running on a computer on the basis of observed user behavior in the context of a software application.

Business Performance Drivers (and BPD Packages)

Business Performance Drivers (BPDs) are a metric applied to data to indicate a meaningful measurement within a business area, process or result. BPDs may be absolute or relative in their form of measurement.

The Business Performance Driver (BPD) concept differs from the known KPI concept by introducing BPDs that
(1) may have multiple dimensions,
(2) place the BPD in the context of the factors used to calculate them,
(3) provide well understood points of reference or metadata around which visual document creation decisions can be made, and
(4) may contain one or more methods of normalization of data.

Common groups of BPDs are called BPD Packages. For example, BPDs relating to one industry (say, telecommunications) can be grouped into one BPD Package. BPDs may be classified into one or more BPD Packages. For example, Net Revenue with normalizations available of per customer or per month may be applicable in a number of industries and hence, applicable to a number of BPD Packages.

Spatial Maps

Spatial maps allow for a user-owned and defined spatial map and/or for the user to use publicly available context maps such as Google™ Maps or Yahoo™ Maps. In either case, the user can display selected BPDs on the chosen spatial map.

Typically, a user-owned spatial map may be the inside floor space of a business and a publically available context map may be used for displaying BPDs on a geographic region e.g. a city, county, state, country or the world.

Application Components

The described application includes two main components, the Application Servers and the Application Infrastructure.

The Application Server includes a number of servers (or server processes) that include the Rendering Engine (to make (or render) the Visual Documents), Metadata Servers (for the BPD Packages, the Visual Designs and the BPDs) and the Request Queue.

The Application Infrastructure is also comprised of a number of servers (or server processes) that may include a Listener (which 'listens' for document requests) and central error logging.

Based on the user selections made above (Visual Documents, Visual Designs and BPDs), the user can click on an action and send a communication to a third party system (CRM, Business Intelligence or other application). The third party system could, for example, load the list from the solution and then send out a personalized email to all members on that list.

According to one embodiment, the described server components of the application are a Java based application and utilize application framework such as the IBM™ WebSphere application server framework, other platforms and server applications may be utilized as alternatives. The client application may be a mashup that utilizes the server components or it could be a rich internet application written using the Adobe™ Flash framework.

Other key elements of the system may include:
  Parallelism—Parallel processing to increase responsiveness or to increase workload scalability of queries or Visual Documents. This parallelism may also decrease response time for larger visual documents in particular animated images may be executed in a parallel fashion.
  Security—System and user-access security. This security may be a combination of authorization and authentication. The security framework may be implemented using the application framework.
  Map Updates—A map management tool to update user-owned spatial maps.
  Predictive Modeling—This may be an interface to third-party predictive models.
  Configuration Tools—The application may be supported by configuration tools to enable rapid deployment of the application.

Modular Overview

Module Descriptions

Figure 2B:
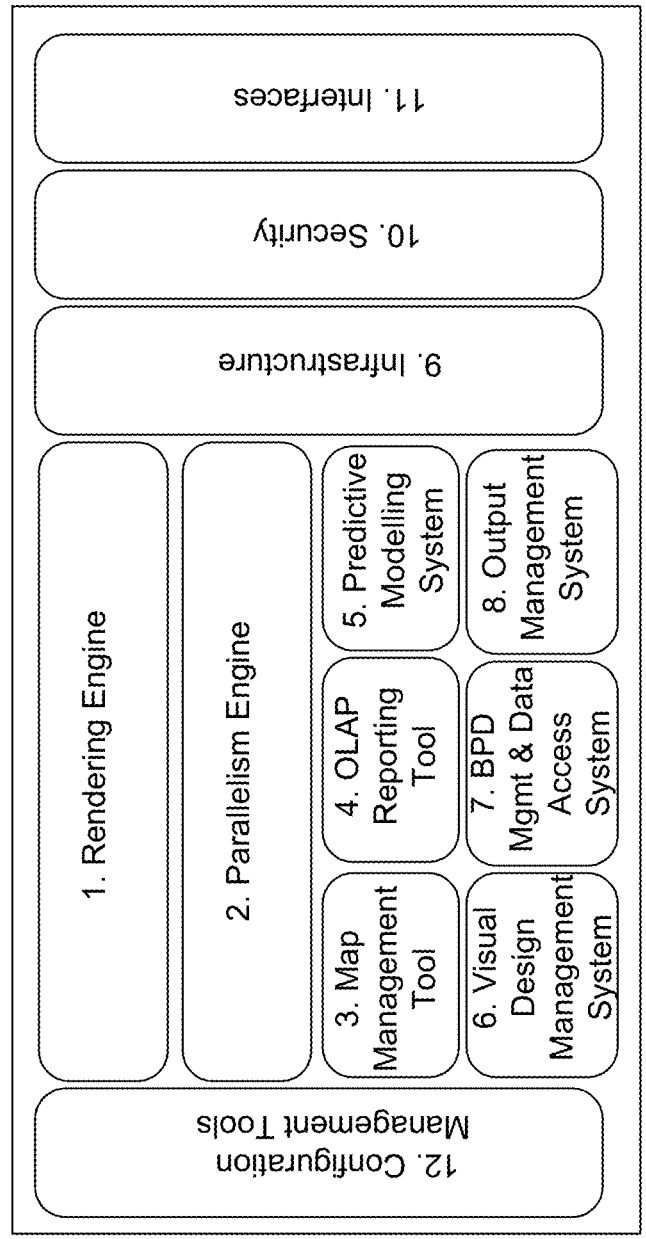
FIG. 2B shows an overview of the software modules in the described system.

The diagram shown in FIG. 2B shows an overview of the software modules in the described system.

These modules are described in the subsequent table. More detailed descriptions and diagrams of each of the software modules are provided below.

The table below outlines the following four items in relation to each module:

1. Technology System Component: This is the name given to the system component; this name matches the name in the above diagram.
2. High Level Functional Description: Describes the role of the software module.
3. Caching: Indicates whether this module uses caching to optimize performance.

| Technology System Component | High Level Functional Description | Caching |
|---|---|---|
| 1. Rendering Engine | Produces images and animations; could use Google ™ Maps or Yahoo ™ Maps for spatial context map. The development of Special Layers enables Visual Document produced to have unique capabilities that were not previously readily available. | Yes |
| 2. Parallelism Engine | Enables parallel execution of requests for high volume of Visual Document output and rapid results delivery to users. The preferred application framework selected is the IBM ™ WebSphere product. This framework enables the application to be scaled across multiple servers. | Yes |
| 3. Map Management Tool | Provides key map editing features (specifically CAD like) and map version control (desktop and enterprise) tools. | Yes |
| 4. OLAP Reporting | Industry standard online analytical reporting. For example, sorting, filtering, charting and multi-dimensional analysis. It is desirable that the user interaction with the data selection process in the data view is seamless with the data visualization view. For example, if the user selects 5 customers from the data view, the same 5 customers should be selected in the visualization view. This means that the solution may be a hybrid view (as discussed later). This hybrid view is a 'simple' view and is an interface to an industry leading OLAP tool. One option includes interfacing to the OLAP tool via a JDBC interface from the described solution or a web service model for the selection management. | Yes |
| 5. Predictive Modeling System | An interface to external predictive modeling engines; may also have some modeling systems. For example, Self Organizing Maps (SOM). | Yes |
| 6. Visual Design Management System | Tools for users to manage the different Visual Designs. | No |
| 7. BPD Management and Data Access System | Tools for users to manage the different BPD Packages and their associated BPDs. Contains Data Access capability that enables data to be queried from RDBMS (or potentially other data sources). | No |
| 8. Output Management System | For management of the documents (Visual Documents) within the system. | Yes |
| 9. Infrastructure | Core system management functions including system logging and Request Queue management. The Request Queue is also described under parallelism and there may be crossover between these two module descriptions. | Yes |
| 10. Security | Enables access to the system (or parts thereof) to be properly controlled and administered. | No |
| 11. Interfaces | Allows services to be called by (or to call) external applications. | No |
| 12. Implementation Tools | Tools to deploy and configure the software system. | Yes |

Architectural Views of the System

This section contains descriptions and diagrams of the architectural views of the system. The architecture shows how the system components fit and operate together to create an operational system. If compared to a vehicle, the wiring diagrams, the physical body, the driving circle and key complex components like the engine would be shown in architectural views.

This view does not describe how the system is written; it describes the high-level architectural considerations.

Architectural considerations are typically implemented by one or more software modules. The modular view described herein lays out a high-level view of how the software modules are arranged.

Figure 3:
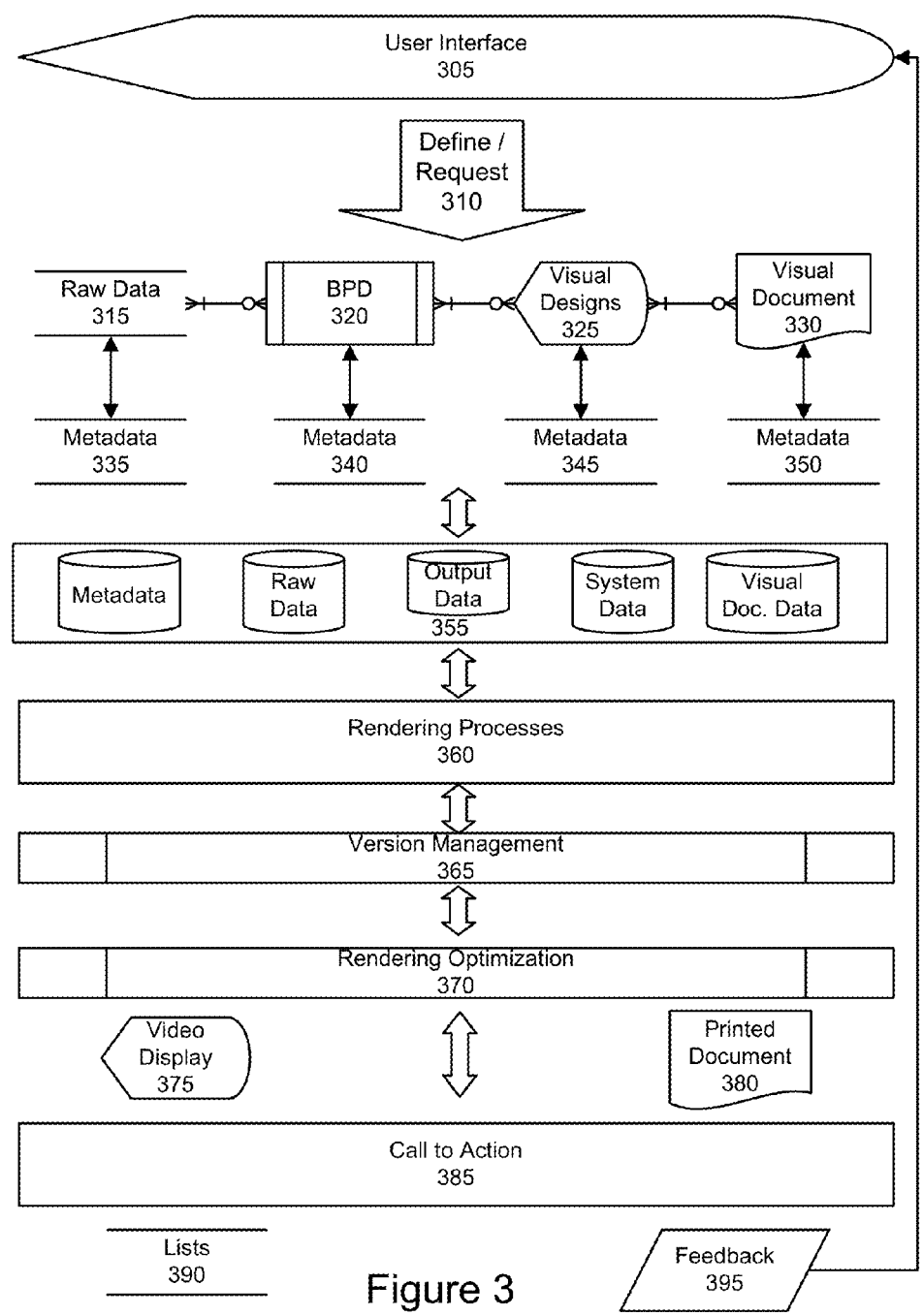
FIG. 3 shows a general overview of the data flow within the system according to an embodiment of the present invention.

FIG. 3 shows a general overview of the data flow within the system.

Figure 4:
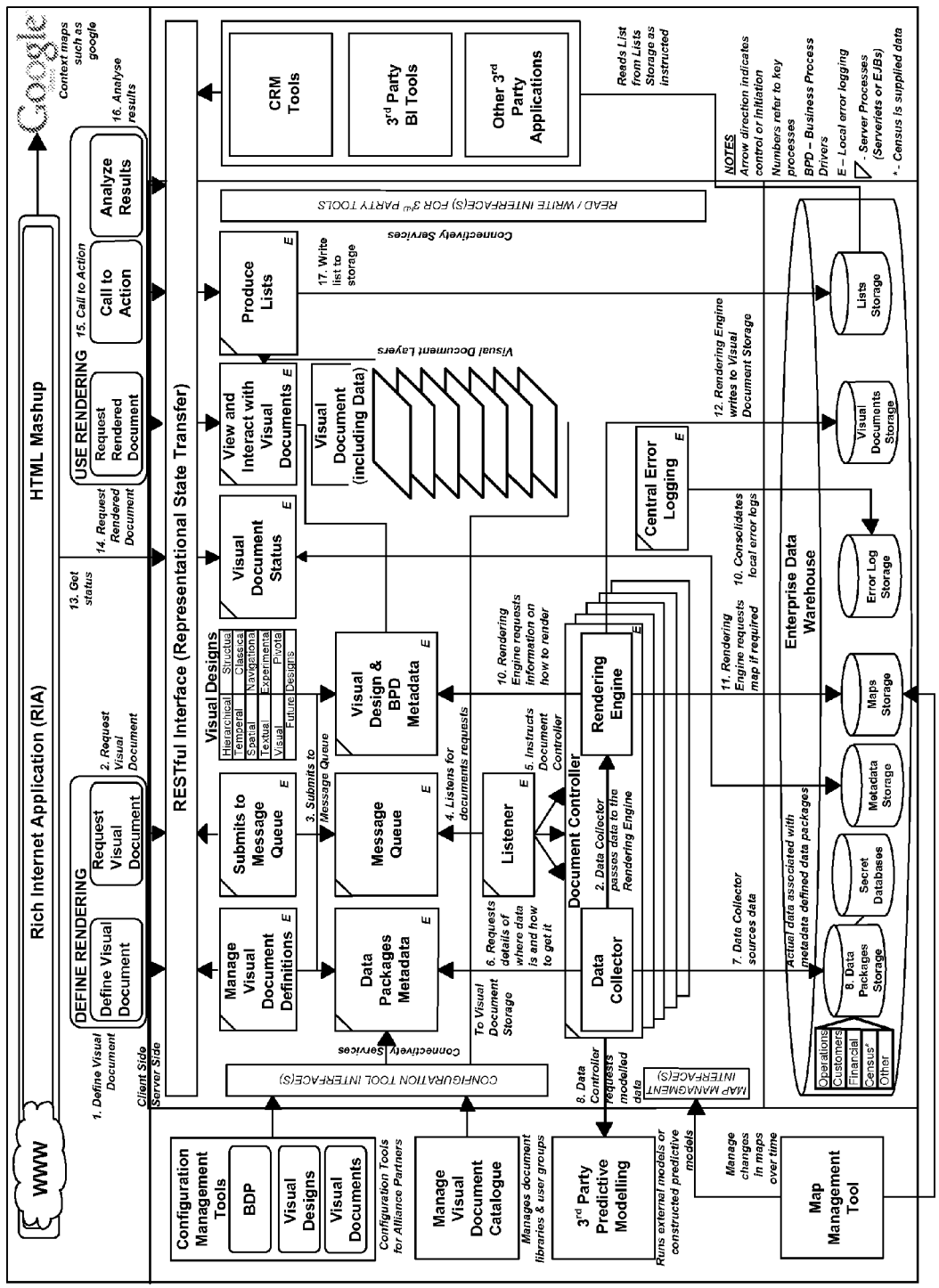
FIG. 4 shows an architectural overview of the described solution according to an embodiment of the present invention.

FIG. 4 shows the architectural overview of the described solution. This diagram is elaborated by the diagrams and descriptions in following sections of this document.

The following modules or components are shown:

Web interface Module 4105: User interfaces are browser based or may be a web services client, a rich internet application or may be a thick client. In all cases the user interface uses the same interface to the back end services.

Rendering Definition Module 4110: The user interface is used to define and request the rendering of Visual Documents Rendering Use Module 4115: Visual Documents are used for analysis, and precipitate calls to action.

Connectivity Services Module 4120: The definition and rendering of Visual Documents is performed through a set of programs or services called the Connectivity Services.

Configuration Management Tools Module 4125: Multiple versions of the basic elements; BPD, Visual Design, Visual Documents; are managed by a set of programs called the Configuration Management Tools.

Visual Document Management Catalog 4130: One such Configuration Management Tool (4125) is a set of programs that manage a users' catalog of available Visual Documents.

Predictive Modeling Module 4135: Predictive modeling is used for forecasting unknown data elements. These forecasts are used to predict future events and provide estimates for missing data.

Map Management Tool 4140: Another of the Configuration Management Tools (21125) is the Map Management Tool. It is designed to manage versions of the spatial elements of a visual design such as a geographic map or floor plan.

Visual Document Definitions Management Module 4145: Visual Document Definitions are managed through the use of metadata (4175).

Message Queue Submission Module 4150: Requests for Visual Documents are handled through queued messages sent between and within processes.

Visual Design Type Module 4155: Visual Documents are comprised of one or many Visual Designs in these categories.

Visual Document Status Module 4160: The status of Visual Documents is discerned from the metadata and displayed on the user interface.

Interaction and Visual Document View Module 4165: The user interacts with the Visual Documents through the user interface, and appropriate changes to and requests to read are made to the metadata.

List Production Module 4170: Where additional output such as customer lists are required, they are requested using the user interface and stored in the EDW (4215).

Data Packages Metadata Module 4175: Metadata is used to describe and process raw data (data packages).

Message Queue Module 4180: Messages may be queued while awaiting processing (4150).

Visual Design and BPD Metadata Module 4185: Metadata is used to describe and process the BPD's and Visual Designs associated with a particular Visual Document.

Visual Documents Module 4190: Visual Documents may be comprised of layered Visual Designs.

Third Party Modules 4195: Visual Documents may be used with or interact with other third party tools.

Listener Module 4200: The listener processes messages (4150) in the message queue (4180)

Document Controller Module 4205: The document controller is used to provide processed data to the rendering or query engines.

Central Error Logging Module 4210: System errors are detected and logged in the EWP (4215).

EDW 4215: All data is typically stored on a database, typically, multiple fault tolerant processors in an Enterprise Data Warehouse.

The following architectural components are described in more detail.

| Architectural Component | Description |
| --- | --- |
| Connectivity Services | This is a common communication service that is used when sending messages between systems (i.e. the described solution and 3$^{rd}$ party tools) and between the described application layer and the user interface layer. |
| Configuration Management Tools | Allows specialized users to configure Visual Designs and Visual Documents to their needs - which differ from the default configuration provided. |
| Manage Visual Document Catalog | Gives selected users the ability to search, sort, group, and delete Visual Documents in the Visual Document Catalog. |
| Predictive Modeling | External modeling systems that use data sent from the described solution to perform complex calculations to produce predictive data. This predicted data is piped through the described solution to the user. |
| Map Management Tool | This is an application that enables users to create modify and delete individual maps to manage the complete sequences, this is very appropriate for management of floor plans. |
| Data Packages Metadata | The services responsible for providing metadata that enables the requester (typically, Data Collector) to source the data for the BPD. |
| Visual Design & BPD Metadata | The services responsible for providing the metadata to the requester (typically the Rendering Engine) that enables the construction of the Visual Documents. |
| Request Queue | The Request Queue manages the communication of requests for rendering of Visual Documents. These communications may be scheduled. |
| Document Controller | The Document Controller consists of two components. The first is the Data Collector responsible for reading the appropriate metadata and retrieving the data from the EDW (Enterprise Data Warehouse). This data is passed to the Rendering Engine that is responsible for producing the Visual Document. Document Controllers run parallel Visual Document requests, build and store documents. |
| Read/Write Interface for 3$^{rd}$ Party Tools | The described solution provides a common interface for 3$^{rd}$ party tools to communicate with e.g. CRM applications. |
| 3$^{rd}$ Party BI Tools | One of the 3$^{rd}$ party tools that the described solution may integrate with is an external OLAP tool. |
| Secret Databases | Secret databases are a method of sharing encrypted databases and providing a SQL interface that enables end users to run queries against atomic data without discovering the details of the data. |

The following terms have been also been used in FIG. 4. These are explained in more detail below.

| Architectural Component | Description |
| --- | --- |
| Logging | Logging (for example, error logging and access logging) is an inherently difficult activity in a parallel independent and predominantly stateless system.<br>The main issue that arises is that logging presents potential links between systems and therefore dependencies.<br>Typically within the application, each server will be responsible for its own logging. This ensures that the system scales without degradation in performance.<br>A separate process (central log reader) may be used to consolidate these logs dynamically as and when required. |
| Web Server | Web Servers respond to requests from users to provide Visual Documents. They read any required information from the metadata servers and Visual Document storage servers. If necessary they write Visual Document requests to the Request Queue. |
| Metadata Servers/Storage | Metadata servers are responsible for storage and user views of metadata. The metadata servers are also responsible for the validation of user rights to read Visual Documents (within the application). |
| Visual Document Storage | The Visual Document Catalog is a secure storage for all Visual Documents. Access is only possible when security requirements are met. |
| Data Collector | Typically the data collector queries the customer's data warehouse. The data warehouse can be augmented with additional subscribed embellishment data. This will provide the raw data that is represented visually back to the user. |
| BPD Packages Metadata | The described solution will use metadata to define groups of BPDs. These groups of BPDs are called BPD Packages. BPD Packages enable both internal data measures to be efficiently installed and external datasets to be provided.<br>BPD packages contain no data. |

Figure 5:
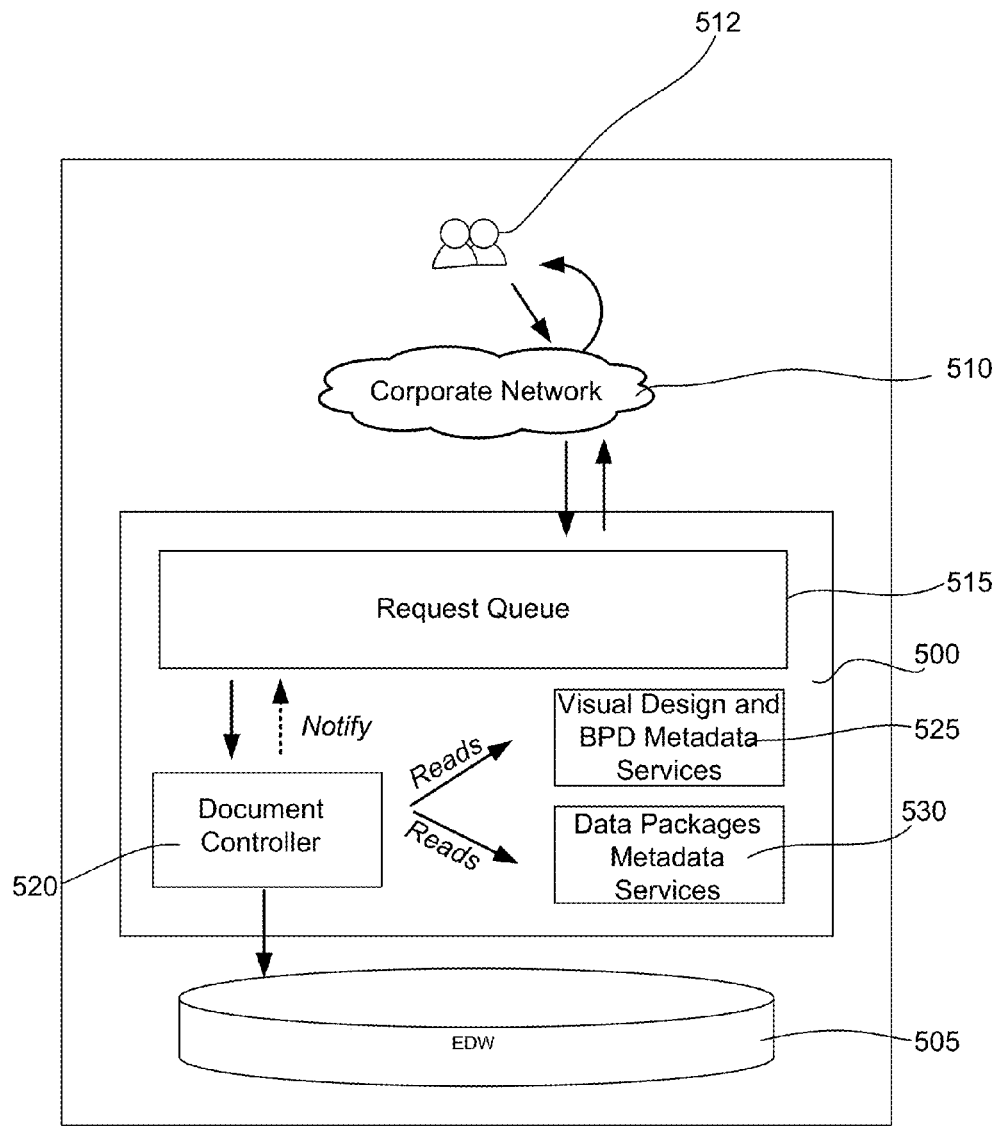
FIG. 5 shows a high-level system delivery overview of the described solution according to an embodiment of the present invention.

A further high-level system delivery overview of the solution is set out as shown in FIG. 5.

The described solution 500 is hosted by the enterprise 510. The figure shows the logical flow from the submission of a request to the end result, viewing the rendered Visual Document.

The data being visualized belongs to the customer 512 and the submitted request is unknown to the entity running the visualization system 500.

The controlling entity, integrators and customers may wish to have summaries of technical performance data (usage patterns, errors etc) sent from the operational system back to the integrator or controlling entity.

The system 500 has access to the data in a EDW 505. The system utilizes a request queue 515 to control requests from a corporate network 510. These requests are forwarded to a document controller 520. The document controller 520 accesses both the EDW 505 and reads visual designs and BPD metadata services 525, as well as data packages metadata services 530.

The system described thus enables various methods to be performed. For example, data is transformed into visually interpretable information. The visually interpretable information is in the form of visual representations that are placed within one or more visual documents.

Figure 6A:
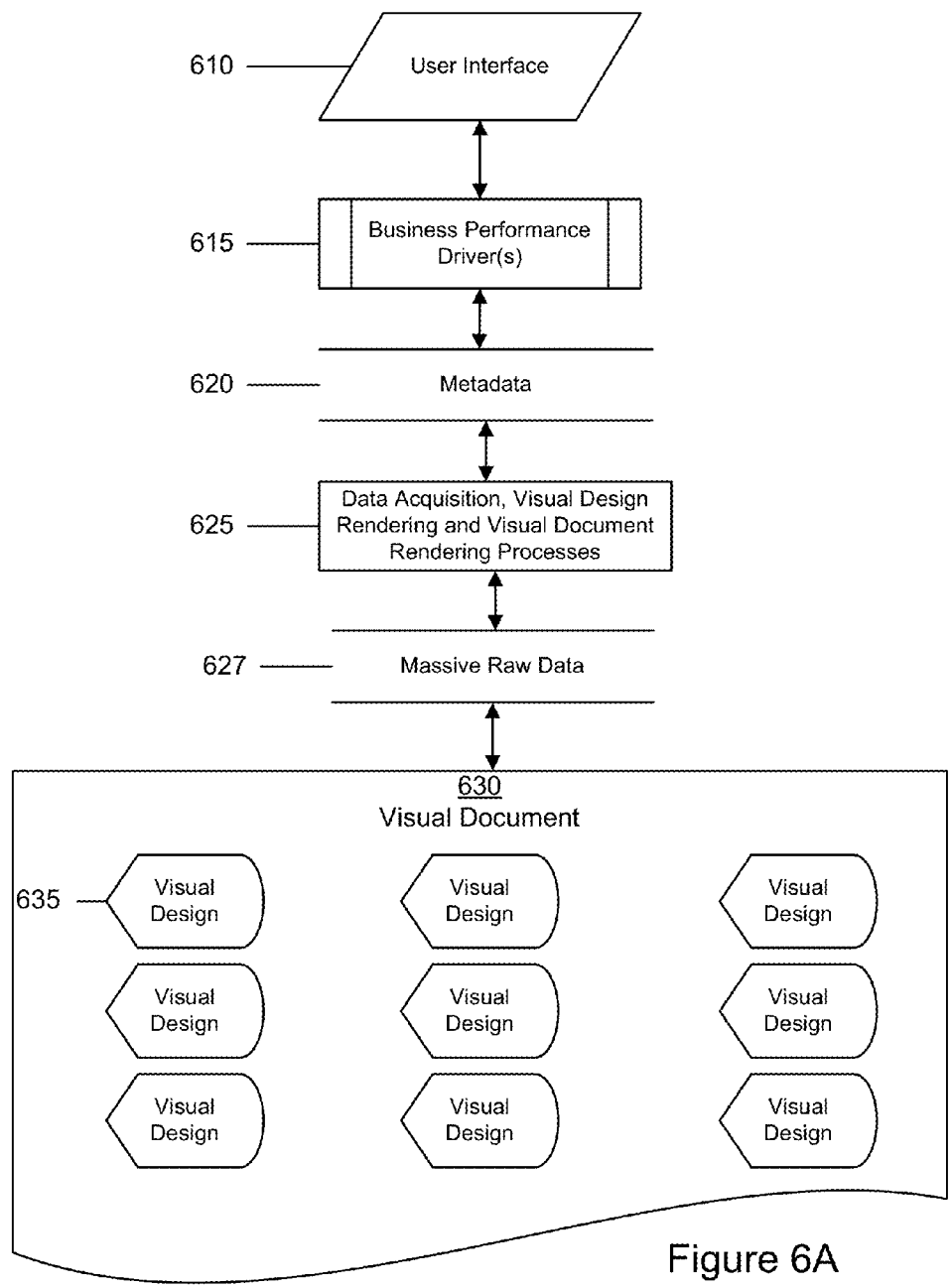
FIG. 6A shows a general data flow diagram according to an embodiment of the present invention.

FIG. 6A shows a general data flow diagram for the described system.

The User Interface 610 allows the user to define BPD's 615 in terms of raw data 627, which become the focus of the Visual Document 630.

Further, the User Interface 610 allows the user, through automated expert help, to create the Metadata 620, the most appropriate Visual Designs 635 that make up the Visual Document 625 in order to provide detailed analysis of data related to the BPD 615. The data acquisition, visual design rendering and visual document rendering processes utilize massive amounts of raw data 627.

The Metadata 620 is used by the Processes 625 to optimize the acquisition of the appropriate Data 627, processing of the data into useful information, and to optimize the creation and rendering of the Visual Designs 635 and the Visual Document 630 that contains them.

This method includes the steps of providing comprehensive yet easy to understand instructions to an end user that has accessed the system and the visual design application. The instructions assist the end user in obtaining data associated with a theme, wherein the theme may be focused on objectives that have been derived from the data. The objectives may be business objectives, for example. In this way, the system guides a user carefully through the many choices that are available to them in creating the visual representations, and the system automatically tailors its instructions according to not only what the user requires, but also according to the data that is to be represented. The system focuses on providing instructions to enable a visual representation to be created that will enable an end user to more effectively understand the data that has been collated.

Further, the instructions assist the end user in determining one or more summaries of the obtained data that enable the end user to understand the theme, as well as organizing the determined summaries into one or more contextual representations that contribute to the end user's understanding of the theme.

Further, instructions are provided that assist an end user in constructing one or more graphical representations of the data, where each graphical representation is of a predefined type, as discussed in more detail below, and includes multiple layers of elements that contribute to the end user's understanding of the theme.

Finally, instructions are provided to assist an end user in arranging the produced multiple graphical representations in a manner that enables the end user to understand and focus on the theme being represented as well as to display or print the organized graphical representations. The system assists in the organization or arrangement of the representations, elements thereof, within the visual document so as to ensure certain criteria are met, such as, for example, providing a suitable representation in the space available, using the minimum amount or volume of ink to create the representation, and providing a suitable representation that depicts the theme in a succinct manner, or visually simplistic manner.

The data being processed to create the graphical representations may be particularly relevant to the theme being displayed, disparate information or indeed a combination of relevant and disparate information.

There are multiple types of graphical representations that may be included within the visual document. The types are discussed in more detail below and include a hierarchical type, a spatial type, a virtual type, a classical type, a navigational type, a temporal type, a textual type, a structural type, a pivotal type, and an interactive type.

Further, the instructions may assist an end user in arranging the graphical representations in order to display high density data in a manner that conveys important information about the data, rather than swamping the end user with multiple representations that look impressive but do not convey much information.

In addition instructions may be provided to assist the end user in arranging the graphical representations to allow supplementary information to be added, where the supplementary information may be provided in any suitable form. Particular examples provided below depict the supplementary information being provided in subsequent visual layers that overlay the graphical representation. Alternatively, or in addition, supplementary information may include additional elements to be displayed within a single layer of the representation, for example, in the form of widgets.

Figure 6B:
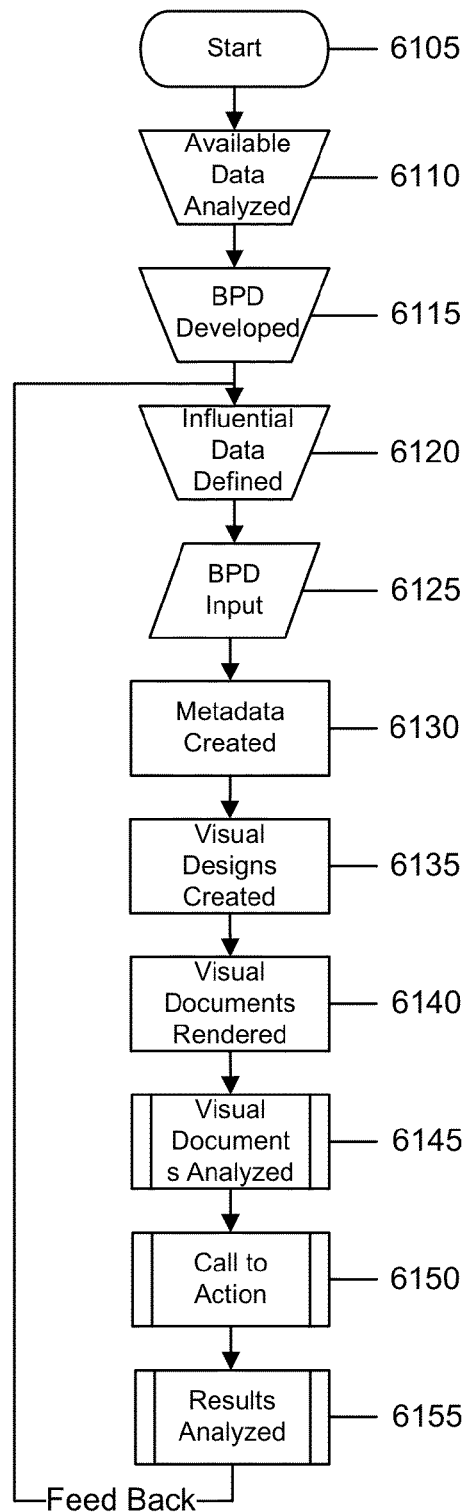
FIG. 6B shows a flow diagram according to an embodiment of the present invention.

FIG. 6B shows a flow diagram according to this embodiment of the invention.

Step 6105: Process Starts. User decides to manage the business.

Step 6110: Available data is identified and analyzed.

Step 6115: Business Process Drivers (metrics defined in terms of the data to indicate a meaningful measurement within a business area, process or result).

Step 6120: Data influencing the BPD metrics are identified.

Step 6125: BPD's are input into a computer system

Step 6130: BPD is categorized and appropriate metadata describing it is generated.

Step 6135: Visual Designs to display the influential data are created.

Step 6140: Visual Designs are aggregated into Visual Documents and rendered. Adjustments are made based on the freshness of all components (e.g., BPD, available data).

Step 6145: Visual documents are analyzed by the end user.

Step 6150: The end user decides on and implements actions based on the analysis in 6145.

As touched on above, business performance drivers (BPDs) are used to enable more efficient data analysis so as to produce accurate and relevant visual representations of the data. A BPD is a form of advanced business measure wherein additional information is included within the BPD that enables the system using the BPD to understand how to manipulate the BPD. That is, one or more intelligent attributes are included with the business measure to form the BPD, where those attributes reference or include information on how the BPD is to be processed or displayed. The form of processing and display may also be varied according to the device type or media upon which the business measures are to be displayed.

The attributes are attached to the business measure by storing the BPD in the form of a mark up language, such as, for example, HTML or XML. It will however be understood that any other suitable format for storing the BPD may be used where the attributes can be linked to the business measure.

In the example of HTML, the attribute is included as a tag. One such example would be to include the data or business measure within the body of the HTML code and follow the business measure with a tag that references the attributes, or dimensions, associated with that business measure.

Further, the attributes may also be modified or deleted, or indeed new attributes added, during or after the processing of the BPD so that the attributes are maintained, or kept up to date, bearing in mind the requirements of the entity using the BPD to visualize their data.

The business performance drivers, or measurable business objectives, are identified in order to create graphical representations of the business objectives, where those representations are placed within a visual document. A business objective may be, for example, a metric associated with a business.

Instructions are provided by the system to the end user, in order to assist the end user in establishing multiple business objectives as functions of available metrics, as well as assisting the user in organizing the business objectives into a contextual form that contributes to the end user's understanding of the business objectives.

Further, instructions are provided to assist the end user in constructing one or more graphical representations of the business objectives, where each graphical representation is of a predefined type, as mentioned above and described in more detail below. Further, each graphical representation includes multiple layers of elements that contribute to the end user's understanding of the business objective.

The elements within the graphical representation may include, for example, a shape, position, color, size, or animation of a particular object.

Instructions are also provided by the system to assist the user in arranging multiple graphical representations in a suitable manner that enables the end user to understand and focus on the business objectives being represented.

Finally, the end user is also assisted with instructions on how to display the organized graphical representations.

The following section describes a method of creating a visual representation of data in the form of a visual design.

The method includes the steps of the system providing instructions to an end user to assist the end user in constructing multiple graphical representations of data, where each graphical representation is one of a predefined type, as defined above and explained in more detail below, and the graphical representation includes multiple layers of elements that contribute to the end user's understanding of the data The system also provides instructions to an end user that assist the end user with arranging multiple graphical representations of different types within the visual representation in a manner that enables the end user to understand and focus on the data being represented, as well as providing instructions to assist the end user in displaying the visual representation in a suitable manner.

The visual representation may be displayed in a number of different ways, such as on a color video screen or a printed page. The information that is forwarded to the display device to create the visual representation may differ according the type of display device so that the visual representation is produced in the best known suitable manner utilizing the advantages of the display device, and avoiding any disadvantages.

The data being displayed may be based on a measured metric or an underlying factor that affects a metric.

The elements within the graphical representation may include a shape, position, color, size or animation of a particular object.

Although a single visual document may include only one type of graphical representation, either in the form of multiple graphical representations or a single representation, there will also be situations where multiple types of graphical representations may be organized within a single visual document in order to convey different aspects of the data, such as, for example, temporal as well as spatial information. The inclusion of different types of graphical representations within a single document can provide an end user with a better understanding of the data being visualized.

Further, the single visual representation may be arranged to be displayed as an image on a single page or screen. This may be particularly useful where space is at a premium yet the user requires the visual representation to be provided in a succinct manner. For example, the user may request certain information to be displayed in a visual representation on a single mobile telephone display, or a single screen of a computer display, in order to show a customer or colleague the results of a particular analysis without the need to flick between multiple screens which can result in confusion, a waste of energy and ultimately a loss of understanding of the visual representations.

The same issue applies to printed representations, where the result of the system enabling a user to arrange a single representation, which may include multiple elements or layers, on a single page not only succinctly represents the data being analyzed but also saves the amount of paper being printed on and the amount of ink being used to print the document.

Further, the amount of ink required for a visual representation may be further reduced by providing instructions to the end user in a manner that directs them to control and use white space in a representation in an efficient manner so as to reduce the requirement of ink.

Multiple types of graphical representations may be merged together within a single visual document, or representation.

As mentioned above, instructions can be provided by the system to assist the end user in adding supplementary information to the visual representation, and the supplementary information may be provided in layers within the representation.

Visualization Framework

The following description provides the visualization framework that will support embodiments of the present invention. The description includes an overview of the importance of Visual Design including a brief historical recount of a world-recognized leading visualization. The description also sets out the Visual Design classifications for the described solution.

It will be understood that the Visual Design examples described in this section are examples for illustrative purposes to identify the concepts behind how the visualization is produced. Therefore, it will further be understood that the concepts described can produce visual designs different to those specifically described. The Visual Design examples shown are also used to help the reader understand the narrative describing the Visual Designs.

The system described is specifically adapted to create actual specific visualization designs relevant to selected vertical and horizontal industry applications being deployed.

A vertical industry application is one that is associated with a solution directed at a specific industry, such as, for example, the entertainment industry. In this example, BPDs relevant to that industry are created, such as rental patterns of movies over different seasons.

A horizontal industry application is one that is associated with solutions across multiple industries. For example, the BPD may be based on CRM analytics, which applies across a whole range of different industries. Design is now a fundamental part of almost every aspect of how people live work and breath. Everything is designed from a toothbrush to every aspect of a web site. Compare visual design to architectural design—in both cases anybody can draw quite complex pictures. The resulting pictures could have stimulating and well drawn graphic elements. In both cases, the question is why does the world need designers? Exploring this question more deeply one can ask—does it make such a difference to how one perceives and understands a design when it is made by a professional rather than an amateur?

The trend in business intelligence is to design tools to provide flexibility and leave the world of visual design to the amateurs. Stephen Few comments in Information Dashboard Design that "Without a doubt I owe the greatest debt of gratitude to the many software vendors who have done so much to make this book necessary by failing to address or even contemplate the visual design needs of dashboards. Their kind disregard for visual design has given me focus, ignited my passion, and guaranteed my livelihood for years to come."

Visual Designs within the described framework are well thought through in how the data is displayed. The described system allows good information visualization design concepts to be captured and delivered back to users as Visual Documents using unique data processing and analysis techniques.

Visual Designs
Method or Visual Design Classifications

According to this embodiment, ten Visual Design types are defined and incorporated into the described system. It will be understood that additional Visual Designs may be further defined including the creation of certain examples and actual Visual Designs for specific industry applications.

The visual design types include:
Hierarchical
Temporal
Spatial
Textual
Virtual
Structural
Classical
Pivotal
Navigational
Interactive The following describes a method for the assessment of Visual Design quality. In assessing the quality of a Visual Design the following factors should be considered:

Alternative approaches—To assess the capability of a Visual Design it is important to contrast it with other visualization methods. In particular one should compare the visual design to a classical graph or table of numbers. This comparison is important as many data visualizations add considerable graphic weight but little informational value.

Visual simplicity—Looking at a visualization should not overload the mind. The simplicity of the visualization is important as it enhances interpretation and allows common understanding without training. Some visualizations require considerable training to be applied. In general, the described solution will not use these visual designs.

Data density—the density of data in a visualization is a critical measure of its overall value. Higher density visualizations, if successful in maintaining their simplicity, have considerable potential to increase the flow of information to end users.

Volume of ink used—Is the visual design using negative space to show key information? This use of negative space allows lower volumes of ink to be used while showing the same or higher density of information. In addition, ink required is generally reduced as the number of "views" or pages of data is reduced to convey the same volume of data.

Capability to be illuminated with detail—In the end, data visualization becomes information visualization when the specific details are shown. The ability of a visualization to hold detailed information in specific places, often achieved with labels, is a key element in determining its value as an information visualization.

Visual Design Layers

Figure 7:
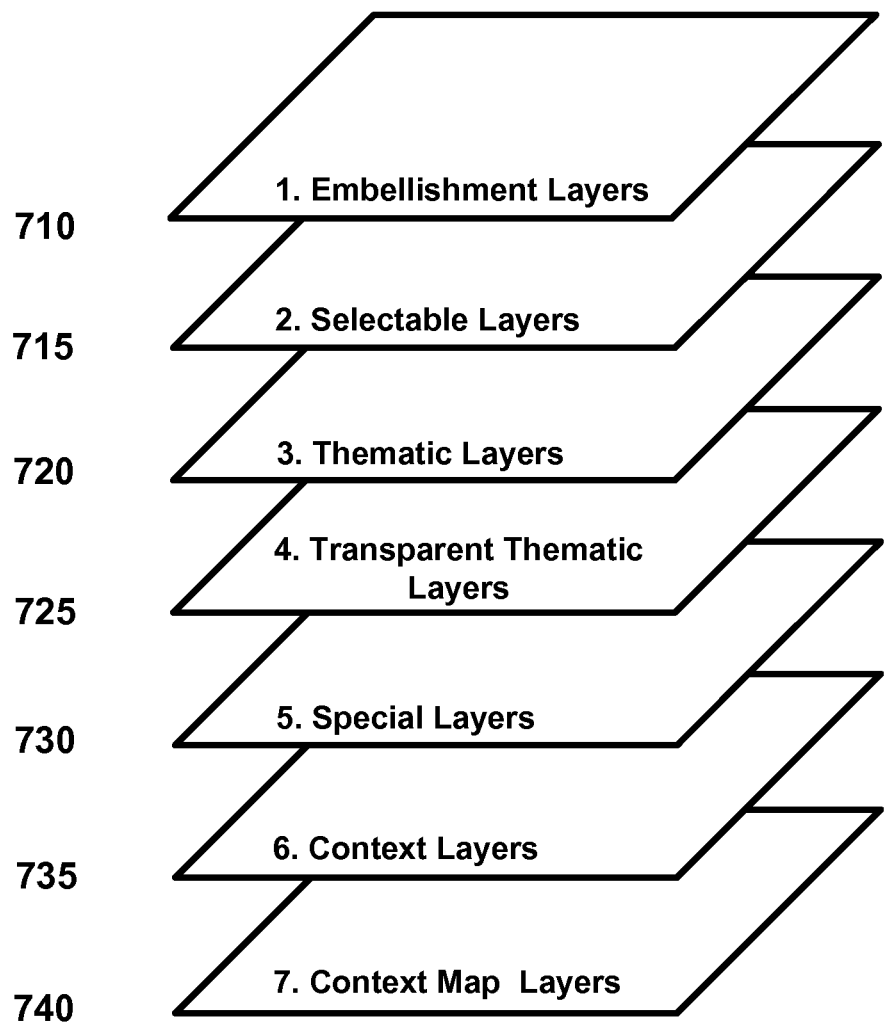
FIG. 7 shows the concept of layers according to an embodiment of the present invention.

There are seven defined Visual Design Layers which are set out diagrammatically as shown in FIG. 7. Other visual design layers may be added as appropriate.

These seven Visual Design Layers are described in the following table:

| Visual Design Layer Type | Description |
| --- | --- |
| 1. Embellishment Layers | Embellishment Layers have labels, symbology and/or other detailed information that is used to illuminate information that is displayed in the lower layers. The overlay can also include controls such as progress bars or spark-lines. |
| 2. Selectable Layers | Selectable Layers are interactive and consist of items that can have associated data. On a retail spatial map it includes store locations as they have associated data. Selectable Layers are typically not obscured by thematic treatments. |
| 3. Thematic Layers | Thematic Layers overlay colors or heatmaps on Special Layers. These thematic treatments become the core visual impact of the final Visual Document. |
| 4. Transparent Thematic Layers | Transparent Thematic Layers are very similar to Thematic Layers (in fact are an alternative). The only difference is that they are graphically merged using a transparent overlay. For example, this kind of layer is necessary to overlay heatmaps on maps.google.com. |
| 5. Special Layers | Special Layers construct the structure of the data. Specifically the Special Layer understands how to automatically draw the data so that other thematic treatments can be applied. Special Layers include mundane layers such as layers of polygons. |
| 6. Context Layers | These are the lowest level of the visualization; they include background maps and other contextual information. |
| 7. Context Map Layers | This is a type of context layer that is rendered from a map such as Google ™ Maps, Yahoo ™ Maps etc. This may be a road map, satellite map or any other map. It is past as a set of tiled images and as such can only be used as a Context Layer. Typically, a Transparent Thematic Layer will be used to display thematic data on a context map layer. |

In terms of the Special Layer, two examples of Special Layers are set out below:

A. Classic Example of Special Layer: Voronoi Diagram
Source: Wikipedia

In mathematics, a Voronoi diagram, named after Georgy Voronoi, also called a Voronoi tessellation, a Voronoi decomposition, or a Dirichlet tessellation (after Lejeune Dirichlet), is a special kind of decomposition of a metric space determined by distances to a specified discrete set of objects in the space, e.g., by a discrete set of points.

In the simplest and most common case, in the plane, a given set of points S, and the Voronoi diagram for S is the partition of the plane which associates a region V(p) with each point p from S in such a way that all points in V(p) are closer to p than to any other point in S.

A Voronoi diagram can thus be defined as a Special Layer, where a set of polygons are generated from a set of points. The resulting polygon layer can then be subjected to thematic treatments, such as coloring.

B. Non Traditional Example of a Special Layer: Calendar

A calendar can be generated as a Special Layer for display of a temporal visual document. This Special Layer would require a 'start date' and an 'end date', most other information regarding the nature and structure of the Calendar could be determined automatically. The thematic layers would then use the structure of the calendar as a basis for thematic treatments such as coloring and contouring.

In an example from ENTROPIA a calendar is shown that can be created into a spiral. The structure and layout of this spiral will be the subject of considerable design discussions by information designers focused on issues such as aesthetics and clarity of information. The result of this discussion is a visual design of a spiral calendar Special Layer. This Special Layer can then be used for thematic treatments such as coloring.

As previously discussed in the above mentioned provisional patent application, an improved method of organizing data sets being graphically represented has been developed as follows.

Embodiments of the present invention are described herein with reference to a system adapted or arranged to perform a method of creating a visual representation of data points from metric data and determining the positioning of data groups associated with the metric data in the visual representation, as well as creating a visual representation of nodes in a tree structure and determining the positioning of the nodes in the visual representation.

In summary, the system includes at least a processor, one or more memory devices or an interface for connection to one or more memory devices, input and output interfaces for connection to external devices in order to enable the system to receive and operate upon instructions from one or more users or external systems, a data bus for internal and external communications between the various components, and a suitable power supply. Further, the system may include one or more communication devices (wired or wireless) for communicating with external and internal devices, and one or more input/output devices, such as a display, pointing device, keyboard or printing device.

The processor is arranged to perform the steps of a program stored as program instructions within the memory device. The program instructions enable the various methods of performing the invention as described herein to be performed. The program instructions may be developed or implemented using any suitable software programming language and toolkit, such as, for example, a C-based language. Further, the program instructions may be stored in any suitable manner such that they can be transferred to the memory device or read by the processor, such as, for example, being stored on a computer readable medium. The computer readable medium may be any suitable medium, such as, for example, solid state memory, magnetic tape, a compact disc (CD-ROM or CD-R/W), memory card, flash memory, optical disc, magnetic disc or any other suitable computer readable medium.

The system is arranged to be in communication with external data storage systems or devices in order to retrieve the relevant data.

In one embodiment when arranging data points in a graphical representation it is usual to merely arrange them in a predefined order, such as alphabetically, or some other arbitrary order. Although this still effectively shows the values of those data points individually, there is a large amount of information that can be missed due to the data points not being arranged in a more effective manner. This is due to data within the representation being related across only a single axis. This problem can be exacerbated depending on the type of visualization being used, and in particular with structural visualization types.

For example, a heatmap can show how neighboring data points correlate with each other. However, unless the data points are arranged in a manner that takes into account how those neighboring points correlate, the heatmap can convey spurious information which may lead to false data reporting or analysis.

Therefore, a system and methodology that provides analysis of the data points or groups of data points or their metadata in order to determine an optimal or definitive order of the datapoints, groups or metadata is beneficial.

It will be understood that the system herein described includes one or more elements that are arranged to perform the various functions and methods as described herein. The following portion of the description is aimed at providing the reader with an example of a conceptual view of how various modules and/or engines that make up the elements of the system may be interconnected to enable the functions to be implemented. Further, the following portion of the description explains in system related detail how the steps of the herein described method may be performed. The conceptual diagrams are provided to indicate to the reader how the various data elements are processed at different stages by the various different modules and/or engines.

It will be understood that the arrangement and construction of the modules or engines may be adapted accordingly depending on system and user requirements so that various functions may be performed by different modules or engines to those described herein.

It will be understood that the modules and/or engines described may be implemented and provided with instructions using any suitable form of technology. For example, the modules or engines may be implemented or created using any suitable software code written in any suitable language, where the code is then compiled to produce an executable program that may be run on any suitable computing system. Alternatively, or in conjunction with the executable program, the modules or engines may be implemented using any suitable mixture of hardware, firmware and software. For example, portions of the modules may be implemented using an application specific integrated circuit (ASIC), a system-on-a-chip (SoC), field programmable gate arrays (FPGA) or any other suitable adaptable or programmable processing device.

The methods described herein may be implemented using a general purpose computing system specifically programmed to perform the described steps. Alternatively, the methods described herein may be implemented using a specific computer system such as a data visualization computer, a database query computer, a graphical analysis computer, a gaming data analysis computer, a manufacturing data analysis computer, a business intelligence computer etc., where the computer has been specifically adapted to perform the described steps on specific data captured from an environment associated with a particular field.

Figure 8:
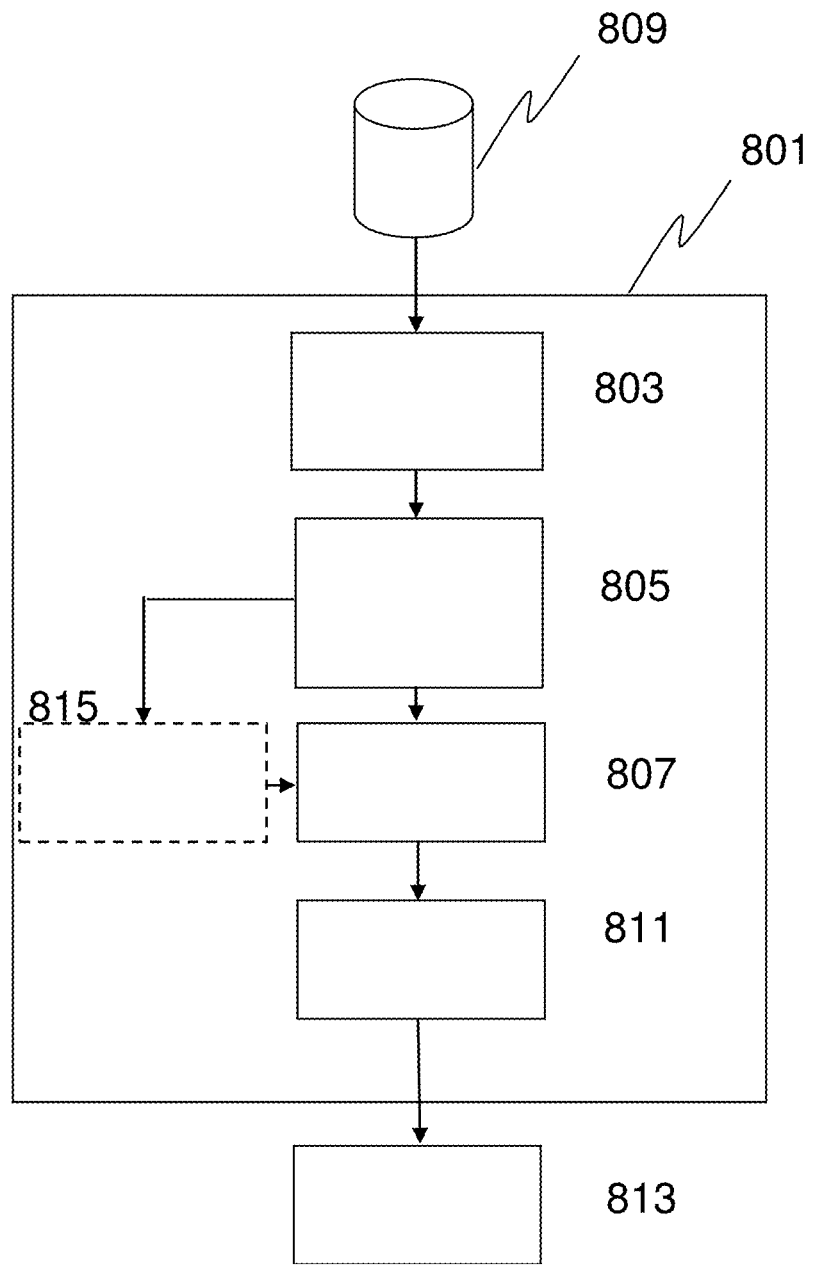
FIG. 8 shows a conceptual system diagram of a data visualization system according to an embodiment of the present invention.

According to this embodiment there is shown in FIG. 8 a conceptual system diagram of a data visualization system 801. The system 801 is arranged to create a visual representation of data points from metric data in order to provide users with greater understanding of their vast amounts of stored data. The system 801 is also arranged to determine an improved positioning of data groups associated with the metric data in the visual representation to provide an optimum positioning arrangement.

The system includes a data retrieval module 803 that is configured to enable the retrieval of metric data from a data storage module 809, which is in communication with the data visualization system 801. The data storage module 809 may be any suitable type of data storage system. For example, it may be an enterprise data warehouse (EDW), a data mart, a database, a storage array or any other suitable device or groups of devices that can store data for later retrieval. Further, the data storage module may be a cache memory used to temporarily store incoming data captured in real time.

The data provided as an input to the system may be of any suitable type of data, for example, real world data including, but not limited to, gaming or gambling data associated with a gaming environment such as a casino, event data, test or quality control data obtained from a manufacturing environment, business data retrieved from an accounting system, sales data retrieved from a company database, etc. All this data may be received by the system in real time in a cache memory or may be stored in a more permanent manner.

The system includes a data grouping module 805 that is configured to arrange the metric data into a plurality of data groups. That is, the data grouping module defines relevant groups of metric data based on the content of the data. The data grouping module may group the metric data by analyzing meta data that is associated with the metric data and using this analysis to group the metric data into relevant groups so that metric data of a similar nature is grouped together. It will be understood that the term group may consist of a single data element.

For example, the grouping of metric data may be by way of specifically located manufacturing plants within a specified region or country.

As another example, the grouping of metric data may be by way of certain product categories where the metric data is test or quality control data associated with those products.

Further, as another example, the metric data may be grouped according to specific financial entities within a business environment. For example, various entities within a casino environment may include gaming machine control, hotel systems, retail systems, business accounts etc.

According to an alternative embodiment, the metric data may be grouped by the data grouping module 805 using any suitable classification algorithm associated with the metric data.

It will be understood that the system may apply the herein described methodology to non-sequential data groups. That is the adjustment may not take place in a linear sequence but may, for example, run in parallel.

Optionally, the data grouping module may redefine data groups based on the received determined statistical distance from the statistical distance determination module. That is, the data points associated with the data groups may be rearranged by the system so that the hierarchical structure is optimized.

The system also includes a statistical distance determination module 807 which receives the data groups as an input, and analyzes those groups to determine a minimal statistical distance between the data groups. That is, the statistical distance determination module 807 determines how each of the groups may be positioned next to each other in the visual representation in a way that minimizes the statistical distance between the neighboring groups. The statistical distance determination module 807 analysis uses a hierarchical force based algorithm on the input data as described below to provide an optimal output.

Hierarchical Force Based Algorithm (Pseudocode)

```
Set up initial node positions randomly // The initial positions may be
arranged into hierarchical structure reflecting the R-Tree
Make sure no 2 nodes are in exactly the same position
  loop
      total_kinetic_energy := 0 // running sum of total kinetic energy over
all particles
      for each node
          net-force := (0, 0) // running sum of total force on this particular
node
          for each layer in the Hierarchy
              for each other node in the layer and one higher layer
                      link-weight := 1 if on this layer otherwise
interlayer-link-weight //interlayer-link-weight is typically higher than one
to attach child nodes together.
                      net-force := net-force + Coulomb_repulsion( this_node,
other_node, link_weight ) * ( 1+ Statistical_Distance(this_node,
other_node)) //Statistical-Distance tends to zero when points should be
very near, this will draw similar points together.
              next node
          next layer
          for each spring connected to this node
              net-force := net-force + Hooke_attraction( this_node,
              spring )
          next spring
          // without damping, it moves forever
          this_node.velocity := (this_node.velocity + timestep *
net-force) * damping
          this_node.position := this_node.position + timestep *
this_node.velocity
          total_kinetic_energy := total_kinetic_energy +
this_node.mass * (this_node.velocity)^2
      next node
  until total_kinetic_energy is less than some small number //the
simulation has stopped moving
```

The system further includes a data visualization module 811 which receives the output from the statistical distance determination module 807 and uses this output to control how the data visualization is rendered. In this embodiment, the output is rendered by visually arranging the data groups on a visual display module 813. The data groups are rendered in a hierarchical manner based on the determined statistical distance in order to create the visual representation.

As an alternative to, or in conjunction with, the display module 813, further output modules may be provided to output the results of the data visualization module. That is, the raw data retrieved by the data retrieval module is analyzed and converted to provide output data in a specific format. The output data is provided to the display and/or further output modules to enable a user to visualize the raw data in a manner that conveys more useful or hidden information that would otherwise be lost.

The further output module may be a printing device in communication with the described system to receive print control data so that representations of the data may be printed on any suitable print medium. Alternatively, the further output module may be an interface that enables the data output from the data visualization module to be interfaced with other data handling modules or storage devices.

The data visualization techniques described herein transform the raw data received into different (and preferably optimal) spatial arrangements to enable further or hidden information within the raw data to be visually represented in a manner that conveys the information to a user in an efficient manner.

The statistical distance determination module is not only arranged to determine the minimal statistical distance between data groups within each level, e.g. a single level, of the hierarchy, but may also be arranged to determine the minimal statistical distance between data groups located within different levels (i.e. between levels) of the hierarchy. Therefore, the data visualization module can utilize the output from the statistical distance determination module to adjust the visual position of each parent and sibling data group pair at different hierarchical levels based on the determined minimal statistical distance between data groups at different hierarchical levels.

It will be understood that the system may be set up to only determine the minimal statistical distance within individual layers or levels of the hierarchy, or only determine the minimal statistical distance between layers or levels of the hierarchy.

The statistical distance determination module may determine the statistical distance based on a number of different methods, algorithms or processes other than the hierarchical force based algorithm described above. For example, the statistical distance determination module may:

i) determine the statistical distance between data groups,
ii) determine the statistical distance based on the similarity of the data groups,
iii) determine the statistical distance based on the sum of the squares of the data groups,
iv) determine the statistical distance based on the output of a heuristic algorithm, such as back propagation neural network values or genetic algorithm associations,
v) determine the statistical distance based on the output of a neural network, and
vi) determine the statistical distance based on a correlation factor between the data groups, for example by calculating the value normalized by the sum of the squares.

Further, the system may also include an indexing module 815 that is adapted to arrange, within an index, the order in which the data groups are positioned. The indexing module receives the grouping information from the data group module and creates an index from which the statistical distance determination module may determine the statistical distance between data groups. The statistical distance determination module may then determine the minimal statistical distance for each individual hierarchical layer using the index.

The indexing module may group the hierarchical layers in an index according to a first specified statistical distance, and then group sub-layers in the index according to a second smaller specified statistical distance. This enables the lower levels in the hierarchy to be grouped more aggressively, meaning that child nodes will tend to cluster around parent nodes.

The data visualization module is also enabled so that it can create the visual representation by positioning the data points in the visual representation in a first dimension (such as the x-axis) based on a first pre-determined characteristic, and then position the data points in a second dimension (such as the y-axis) based on the determined statistical distance. Further, the data visualization module is enabled so that it can position the data points in a third dimension (such as a z-axis on a 3D model) based on a third pre-determined characteristic.

The data visualization module is also arranged to create the visual representation by representing the data groups within the visual representation in a hierarchical manner. That is, the data groups are arranged hierarchically, for example in the form of a tree. The data groups are arranged in the visualization according to one or more of a number of factors, such as, for example, the group's position, order, size or color. It will be understood that any other factors may be taken into account when arranging the data groups.

The data visualization module may also be controlled to visually arrange the data groups in a number of different visual formats, such as for example in the form of an R-tree representation, a skewed R-tree representation, a Ward's correlation representation, a Kamada-Kawai representation, an organizational chart, a table of contents or an index hierarchy.

Figure 9A:
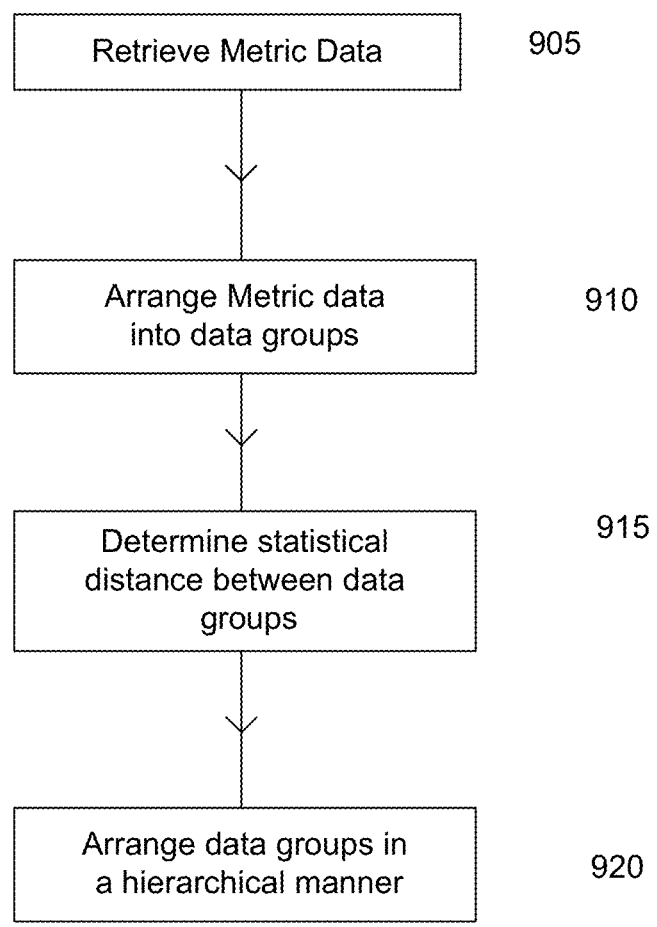
FIG. 9A shows a flow diagram according to an embodiment of the present invention.

FIG. 9A shows a flow diagram of a method according to this embodiment. Metric data associated with the data being represented in the visualization is retrieved at step 905. The metric data is then arranged into data groups at step 910. Using a suitable algorithm as described above, the statistical distance between the data groups is determined at step 915.

The data groups are then arranged in a hierarchical manner according to the statistical distances calculated, as shown at step 920.

By arranging the metric data data groups in this manner the correlation of the data is taken into account when arranging the groups. This reduces the effect of data points being placed adjacent non correlated neighboring data points.

In other words, non-sequential data groups may be arranged to create a visual representation of data points within the data groups, the method may include the steps of determining a statistical distance between the data groups, and arranging the data groups in an order that is based on the determined statistical distance. It will be understood that the term group may consist of a single data element.

By determining how data groups correlate with each other using the above described algorithm, it then becomes possible to arrange the data groups in a more suitable order that enables information to be conveyed to the user that would otherwise not have been conveyed.

Figure 9B:
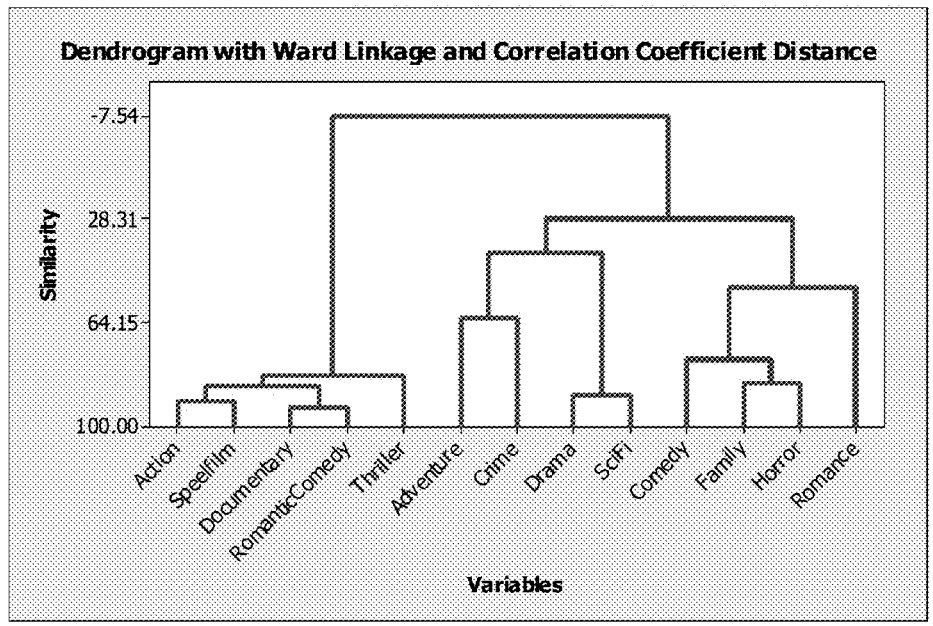
FIGS. 9B and C show correlation diagrams according to an embodiment of the present invention.

FIG. 9B shows one example of the calculated similarity, or correlation, between different variables (film categories) when placed in a random order in a visual representation. The y-axis represents the amount of similarity or correlation between different categories. The smaller the number indicated on the y-axis, the less similar the categories. The value is determined by following the links in the figure, which are created using, in this example, a Ward diagram. Where the links join between the categories, this is the calculated correlation value. For example, Thriller and Crime join together at a value of −7.54, which clearly shows that there is no correlation between these two data groups, yet they are still placed at a position adjacent to each other.

For example, correlation may indicate how often, when one of the movie categories is hired from a DVD rental shop, another movie category is also hired.

Figure 9C:
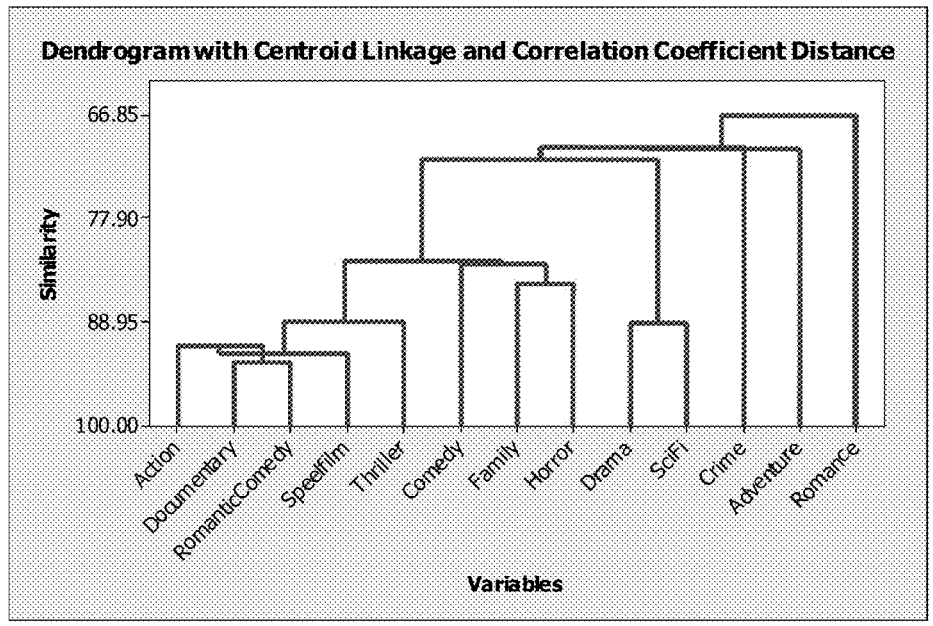

FIG. 9C shows a re-ordering of the groups in FIG. 9B according to the determined correlation values. This clearly shows that the worst correlation value is that between Adventure and Romance categories, thus providing a better and more viable representation of the data across all dimensions.

By grouping data sets in this manner based on correlation, an extra dimension is introduced which provides an in increase in the data density within the visual representation. This increase in data density thus enables the user to have a greater understanding of the data in less space and with the use of less processing time. Further, by providing an increase in data density within the representations, the amount of ink required to produce the information is reduced, for example, by enabling a representation to be placed on a single page rather than over multiple pages.

These types of structural visualizations are very powerful and are closely related to spatial visualization types. Most of the thematic treatments that can be applied to a spatial visualization are equally applicable to a structural visualization.

Examples of uses for such a visual design type would be for visualizing call routing across a network, electricity grid management and route optimization.

It will be understood that a wide variety of Special Layers may be created in this space. These Special Layers essentially generate the structural schematic from the base data.

The hierarchy consists of nodes arranged into layers, and these nodes are the arranged individual items. Interconnections may be explicit or implicit. Often the parent and child nodes are shown as interconnected. Typically the interconnections between nodes are used to generate the structure.

One important aspect of the structural Special Layer is building the structure in such a way that interconnect line crossing is minimized.

Further to the above described embodiment where the methodology is applied to data sets, it is also possible to apply the same methodology to the placement of nodes within a graphically represented tree structure in order to optimize the positioning of those nodes. Therefore, all the relevant steps discussed above may also apply to the arrangement of nodes in a tree structure as described in the example below, rather than the arrangement of data groups. Nodes are the individual items being arranged into the tree structure. Except for leaf nodes, all nodes contain other nodes. This containment defines the R-Tree structure.

A full description on a system that enables the graphical representation of a tree structure in association with a visual design is provided in a co-pending PCT application submitted by the applicant. In summary, a data visualization system is arranged to retrieve data from a data storage system, determine data points based on the retrieved metric data, arrange the data points to be displayed according to a predetermined visual representation, arrange the data points into a plurality of meta groups in a hierarchical manner, arrange the meta groups into a plurality of layers, where each layer represents the data points at different levels of granularity.

By applying the herein described methodology to nodes in a tree structure, the data visualization system can create a hierarchical representation of the data that is displayed within the visual representation. The hierarchical representation may be a tree like representation showing the hierarchical arrangement of the data used in the visual representation. The user may interact with the hierarchical representation (e.g. by selecting a node on the tree) to see where the associated data has been visually represented in the visual representation.

According to this example, at each hierarchical level where there are multiple nodes, the nodes in that level are arranged to be positioned next to the most relevant nodes rather than in an arbitrary fashion as carried out in the prior art. For example, the references in FIGS. 15B and 15C to the movie categories may be graphically represented tree nodes in an index for movies.

The herein described methodology can be applied to any suitable tree structure, such as an R-tree, a standard relationship tree, Quad-Tree, Kamada-Kawai Tree, Wards Linkage Diagram, catalogues, organizational charts, product master files, a system of accounts, etc.

By using this methodology, the nodes are positioned so that they sit next to the most relevant of the other nodes (i.e. they are positioned at a minimum statistical distance to other nodes using the herein described algorithm). This may prove particularly useful in graphical representations of tree structures so that users can navigate the tree structure in a more logical manner by moving through similarly associated nodes that are next to each other.

It will be understood that the system may apply the herein described methodology to non-sequential nodes. That is the adjustment may not take place in a linear sequence but may, for example, run in parallel.

The above described method may also be applied to the printing or publication of more relevant indexes in various different kinds of publications, such as encyclopedias, study guides, reference texts etc, whether in paper form or on the Internet.

It will be understood that the visual representations produced by the various embodiments of the herein described system are specifically adapted to enable the visual representation of complex data in order to convey useful information while minimizing the use of production printing materials or limiting the space in which the information may be conveyed. That is, by enabling the herein described system to produce a visual representation that has one or more characteristics as described to summarize a complex problem or complex data, a number of technical advantages are immediately provided. For example, the characteristics of the visual representation may include the limitation of the size of the visual representation, the use of a minimum amount of ink, or the creation of the representation using a minimal or bounded area space or minimum amount of time. These characteristics then may solve one or more problems such as the excessive consumption of consumable items by reducing the required consumption of consumables such as paper and ink resources, as well as reducing the energy required to produce the printouts of the visual representations or the displaying of the information on a display module due to the ability to provide the required information in a visual space of a smaller size.

Figure 10:
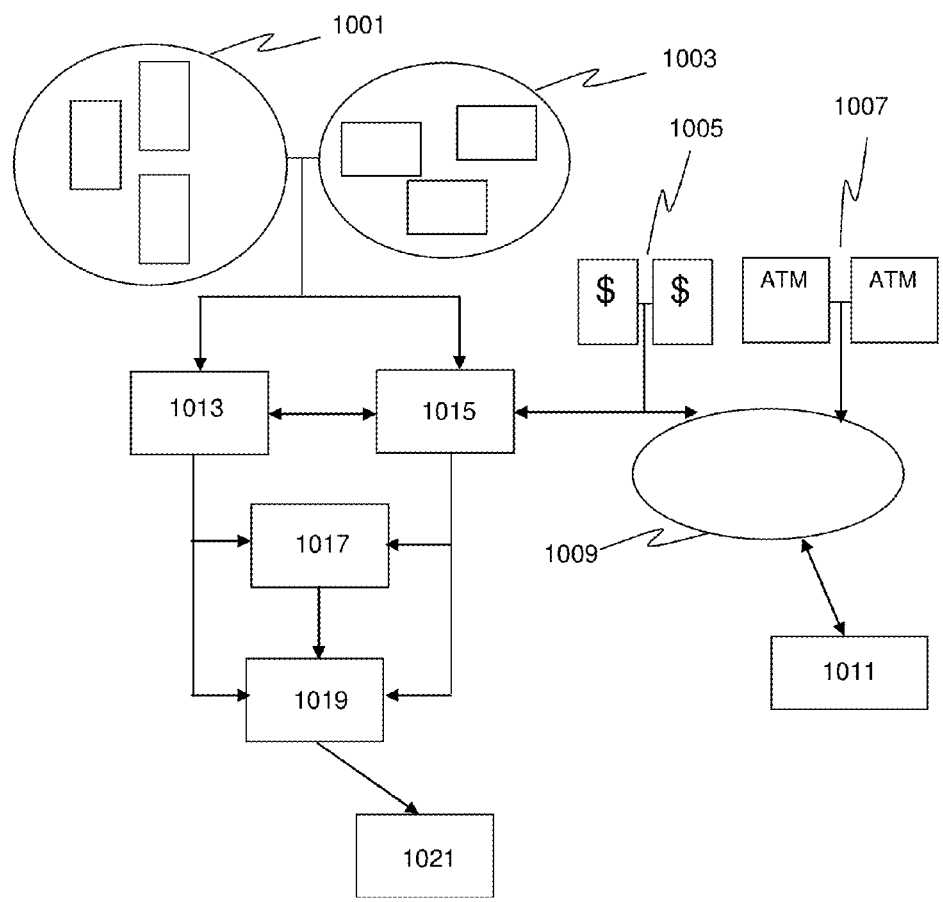
FIG. 10 shows how embodiments of the present invention may be incorporated within a gaming environment.

FIG. 10 shows an example of how the herein described system may be incorporated within a gaming environment. The gaming environment consists of a number of gaming machines 1001 and electronic tables 1003 (among other electronic gaming devices) that are adapted to communicate electronically with other systems using any suitable protocols, such as data packet protocols.

The gaming environment further includes a number of electronic cashier devices 1005 and ATMs 1007 which are in communication via a Wide Area Network 1009 with one or more financial databases 1011.

Data from the gaming machines 1001 and electronic tables 1003 are transferred to a reward program database 1013 and customer database 1015. It will be understood that these two databases may be combined into a single database.

Data from the cashier devices are also transferred to the reward program database 1013 and customer database 1015. The databases 1013 and 1015 are in communication with a central hotel management system 1017 that oversees the operation of the gaming environment, including the activities of customers in other areas of a casino, such as shops, hotels, spas etc.

The system 1019 described herein is in communication with the reward program database 1013, customer database 1015 and central hotel management system 1017 so the system can retrieve all necessary data about the activities within the gaming environment. The various embodiments as described herein are employed by the system 1019 to provide an output 1021.

Embodiments of the present invention are described herein with reference to a system adapted or arranged to perform a method for visualizing data.

The term "tree map" and its associated method is understood to mean the representation of and the method of displaying hierarchical data utilizing nested rectangles. It will be understood that the term rectangle also includes the definition of a square.

According to a further embodiment, a data visualization system is described that is arranged to generate tree map visualizations of data within a number of data sets.

In summary, the system includes at least a processor, one or more memory devices or an interface for connection to one or more memory devices, input and output interfaces for connection to external devices in order to enable the system to receive and operate upon instructions from one or more users or external systems, a data bus for internal and external communications between the various components, and a suitable power supply. Further, the system may include one or more communication devices (wired or wireless) for communicating with external and internal devices, and one or more input/output devices, such as a display, pointing device, keyboard or printing device.

The processor is arranged to perform the steps of a program stored as program instructions within the memory device. The program instructions enable the various methods of performing the invention as described herein to be performed. The program instructions may be developed or implemented using any suitable software programming language and toolkit, such as, for example, a C-based language. Further, the program instructions may be stored in any suitable manner such that they can be transferred to the memory device or read by the processor, such as, for example, being stored on a computer readable medium. The computer readable medium may be any suitable medium, such as, for example, solid state memory, magnetic tape, a compact disc (CD-ROM or CD-R/W), memory card, flash memory, optical disc, magnetic disc or any other suitable computer readable medium.

The system is arranged to be in communication with external data storage systems or devices in order to retrieve the relevant data.

It will be understood that the system herein described includes one or more elements that are arranged to perform the various functions and methods. The following portion of the description is aimed at providing the reader with an example of a conceptual view of how various modules and/or engines that make up the elements of the system may be interconnected to enable the functions to be implemented. Further, the following portion of the description explains in system related detail how the steps of the herein described method may be performed. The conceptual diagrams are provided to indicate to the reader how the various data elements are processed at different stages by the various different modules and/or engines.

It will be understood that the arrangement and construction of the modules or engines may be adapted accordingly depending on system and user requirements so that various functions may be performed by different modules or engines to those described herein, and that certain modules or engines may be combined into single modules or engines.

It will be understood that the modules and/or engines described may be implemented and provided with instructions using any suitable form of technology. For example, the modules or engines may be implemented or created using any suitable software code written in any suitable language, where the code is then compiled to produce an executable program that may be run on any suitable computing system. Alternatively, or in conjunction with the executable program, the modules or engines may be implemented using any suitable mixture of hardware, firmware and software. For example, portions of the modules may be implemented using an application specific integrated circuit (ASIC), a system-on-a-chip (SoC), field programmable gate arrays (FPGA) or any other suitable adaptable or programmable processing device.

The methods described herein may be implemented using a general purpose computing system specifically programmed to perform the described steps. Alternatively, the methods described herein may be implemented using a specific computer system such as a data visualization computer, a database query computer, a graphical analysis computer, a retail environment analysis computer, a gaming data analysis computer, a manufacturing data analysis computer, a business intelligence computer, a social network data analysis computer, etc., where the computer has been specifically adapted to perform the described steps on specific data captured from an environment associated with a particular field.

Figure 11A:
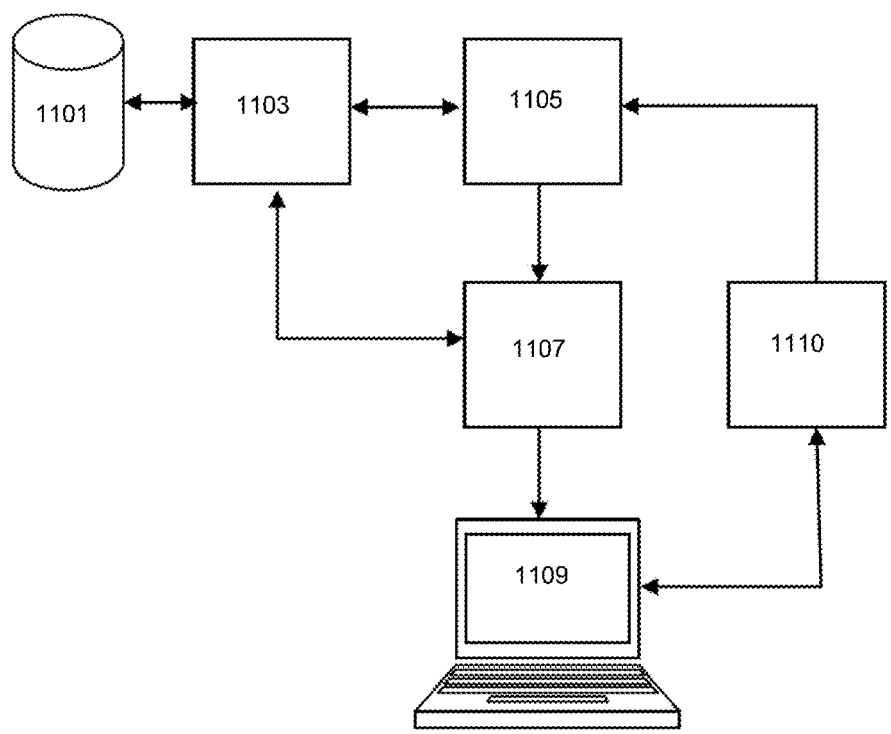
FIGS. 11A and 11B show conceptual system block diagrams according to an embodiment of the present invention.
Figure 11B:
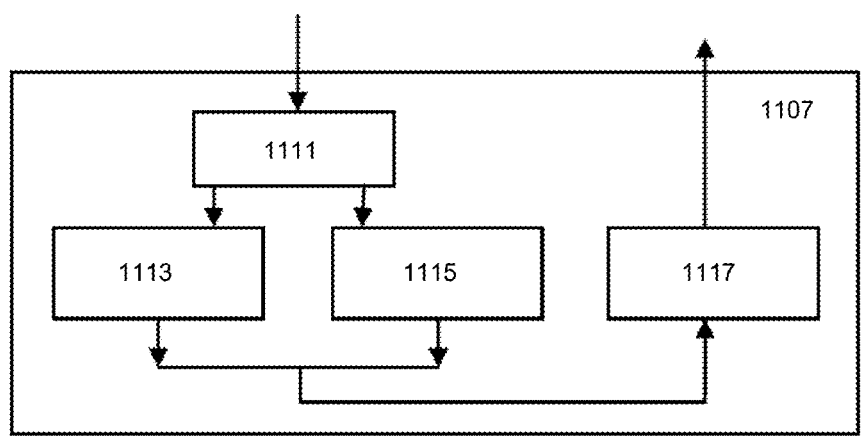

FIGS. 11A and 11B show conceptual system block diagrams according to this first embodiment of the present invention.

A data storage module 1101 is in communication with a data visualization system, and is used to capture and store vast amounts of data. This data may be stored locally or on an accessible external storage device. The data storage module may be any suitable type of data storage system. For example, it may be an enterprise data warehouse (EDW), a data mart, a database, a storage array or any other suitable device or groups of devices that can store data for later retrieval. Further, the data storage module may be a cache memory used to temporarily store incoming data captured in real time. For example, the incoming data may be streaming data.

A data retrieval module 1103 is configured to enable the retrieval of data from the data storage module.

A data visualization engine 1105 forms a core component of the data visualization system. It analyses and sorts the data retrieved by the data retrieval module 1103 to generate various visualizations as selected by a user. For example, the data visualization system may be as described above and in METHODS, APPARATUS AND SYSTEMS FOR DATA VISUALISATION AND RELATED APPLICATIONS earlier filed by the applicant and published as WO2009/154484, which is hereby incorporated by reference.

The data used by the data visualization engine 1105 is transmitted to a tree map generation module 1107, which may form part of the data visualization system or be a standalone discrete system. The output of the tree map generation module is sent to an output module 1109. According to this embodiment, the output module 1109 is a display module that forms part of the data visualization system. The data visualization system also includes input devices for receiving, interpreting and implementing instructions from a user, as is well known in the art.

As an alternative to, or in conjunction with, the display module, further output modules may be provided to output the results of the data visualization system and/or tree map generation module. That is, the raw data retrieved by the data retrieval module is analyzed and converted by the data visualization system and/or tree map generation module to provide rendered output data in a specific format. The rendered output data is provided to the display and/or further output modules to enable a user to visualize the raw data in a manner that conveys more useful or hidden information that would otherwise be lost in an efficient manner.

The further output module may be a printing device in communication with the described system to receive print control data so that representations of the data may be printed on any suitable print medium. Alternatively, the further output module may be an interface that enables the data output from the data visualization system or tree map generation module to be interfaced with other data handling modules or storage devices. As a further alternative, the output module may be the same or different data storage module as described above.

An instruction analysis module 1110 receives instructions from a user who interacts with the data visualization system. The instructions provide the system with details of the data the user wishes to visualize. The instruction analysis module analyses these instructions and determines the data that is required. Based on the received instructions, the instruction analysis module 1110 instructs the data visualization engine 1105 to retrieve the required data. The data visualization engine 1105 then instructs the data retrieval engine 1103 to retrieve the required data from the data storage module 1101. The associated data is then communicated back to the data visualization engine 1105 via the data retrieval module 1103. It will be understood that the instruction analysis module may request the required data directly from the data retrieval module 103. Further, it will be understood that the data may be transferred from the data storage module via the data retrieval module directly to the tree map generation module bypassing the data visualization system.

The instructions provided to the route visualization system by the user also includes an indication of the type or form of the visualization required, such as whether the visualization is for a tree map visualization. The instruction analysis module 1110 also analyses the received instructions to determine the type and form of visualization and communicates this data to the data visualization engine 1105 to enable the data visualization engine 1105 to generate the requested visualization.

FIG. 11B shows a more detailed representation of the tree map generation module 1107. According to this embodiment, the tree map generation module includes a data sorting module 1111, an area defining module 1113, a data point accumulation module 1115 and a rectangle generation module 1117.

The data sorting module sorts the retrieved data sets according to the size of the data sets. For example, the data sets are sorted in order from largest values to smallest values. It will be understood that the data sets may be sorted using any other suitable sorting parameter.

The area defining module defines a displayable area for each rectangle being generated within the tree map based on the data set values. The area is suitable for generating a number of different rectangles using the values associated with the data in the data sets, where each rectangle represents either the data in a single data set, a group of data sets or multiple groups of data sets. This enables the data in the data sets to be visually represented in the defined area using a suitable spatial arrangement.

The data point accumulation module determines the number of data points required to visually represent each rectangle based on the data values in the data sets being visually represented. The rectangles generated are in a hierarchy consisting of a main bounding rectangle, one or more group data set rectangles and multiple data set rectangles.

The main bounding rectangle has a size based on the total number of data points required to represent all data within all data sets within all groups of data sets.

The group data set rectangle has a size based on the total number of data points required to represent all data within the group of data sets being represented in the group data set rectangle.

Each data set rectangle has a size based on the total number of data points required to represent the data values within each data set The total number of data points required is accumulated based on all data values in all data sets being represented. Each of the rectangles generated has dimensions that enable the values of the data in the relevant data sets to be visually represented. The dimensions of each rectangle may be defined based on predetermined parameters, such as the X/Y dimension ratio, for example.

The main bounding rectangle is generated to enable one or more groups of data sets to be visually represented side by side. That is, a first group data set rectangle may be positioned next to one or more further group data set rectangles, where each group of data sets includes multiple data sets.

It will be understood that the main bounding rectangle may be used to represent a single group of data sets, where the main bounding rectangle then becomes the group data set rectangle.

Further, a suitable sized group data set rectangle is created that has dimensions that enable all the values of the data in each data set within a defined group of data sets to be visually represented within the main rectangle. The dimensions of this rectangle may also be defined based on predetermined parameters, such as the X/Y dimension ratio, for example.

The rectangle generation module generates a visual representation of the main bounding rectangle as well as each data set rectangle placed within the main bounding rectangle. Each group of data sets being represented is positioned in a data set group rectangle within the main rectangle.

Within each group data set rectangle are positioned data set rectangles that represent the data within that data set.

Figure 12:
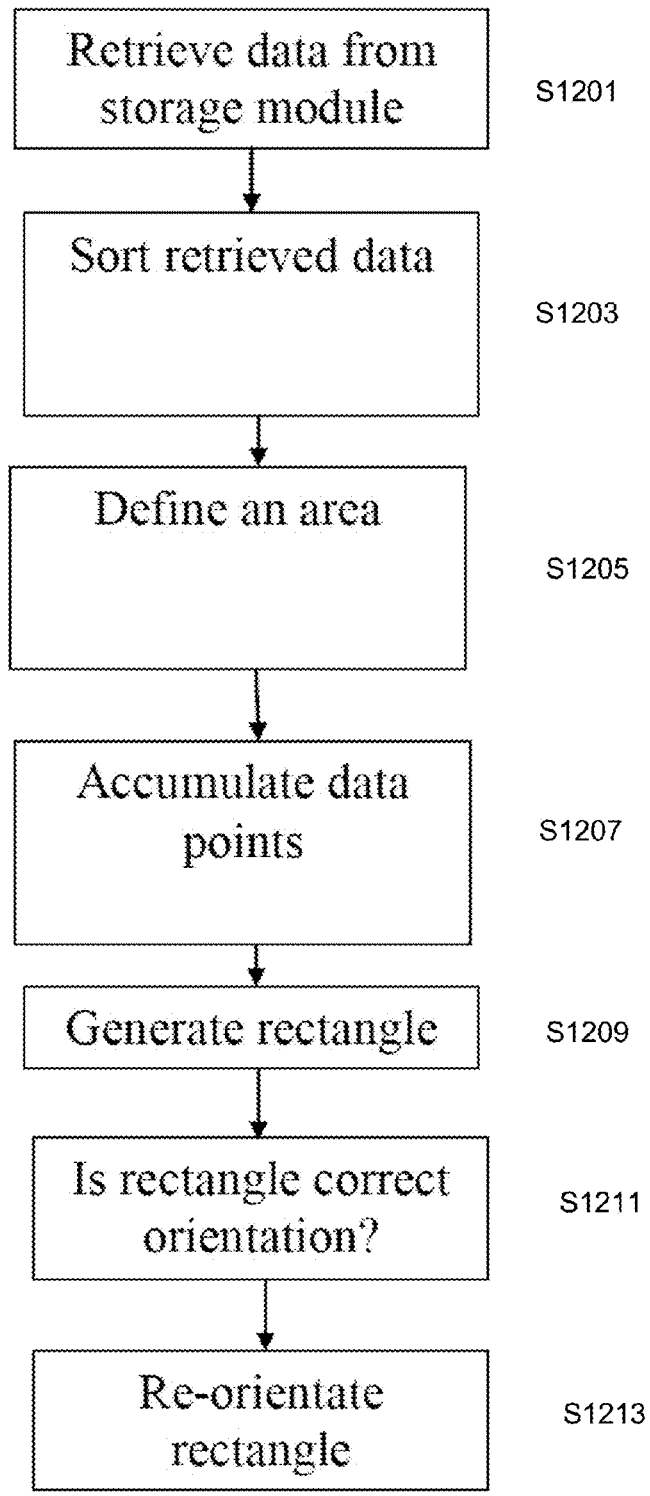
FIG. 12 shows a flow diagram of a method according to an embodiment of the present invention.

FIG. 12 shows a flow diagram of a data visualization method according to this first embodiment.

At step S1201, data is retrieved from the data storage module by the data retrieval module. For example, any suitable database requests may be utilized to retrieve the data requested based on the user's instructions.

At step S1203, upon receiving the data sets, the data sets are sorted by the tree map generation module as described herein.

At step S1205, the tree map generation module defines a display area for generating multiple rectangles, where each of the rectangles represents one of the data sets, and the area is defined by the system to enable the data sets to be visually and/or spatially arranged within the defined area.

At step S1207, data points associated with the data in each data set are accumulated in order to generate rectangles having a suitable configuration. For example, the rectangle is generated so it has X and Y dimensions that fall within a predefined X/Y ratio, or indeed any other suitable configuration parameter. The predefined parameters are stored within a suitable memory device and can be retrieved by the tree map generation module.

At step S1209, each of the data set rectangles is generated by the rectangle generation module.

At step S1211, a determination is made as to whether the data set rectangle being generated above is in the desired orientation. That is, a determination is made as to whether the rectangle being generated fits into the area available to it in its current configuration and orientation.

At step S1213, if the above determination is negative, the rectangle is re-orientated. Further, the rectangle may also be reconfigured in terms of its width and height ratio to make it fit within the available area. The width and height ratio may be adjusted to that it is maintained within predefined limits.

Therefore, tree maps are generated to provide a visualization that enables data to be displayed in a hierarchical format using nested rectangles. This form of data visualization is particularly useful for visualizing multiple aspects of a set of data in a hierarchical format. For example, a hierarchy of the revenue generated by an entity for defined commercial areas may be shown in a tree map alongside a hierarchy of the revenue generated by competitors for the same area. Other hierarchies may also be shown for the same entity to enable the user to understand or identify various correlations and associations between the hierarchies.

It will be understood that the hierarchies listed above are examples only and that other hierarchical tree map representations may be generated based on other data.

The tree map generation module generates a tree map according to the instructions received.

FIGS. 13A to 13G show an example of the steps carried out by the tree map generation module in order to create a tree map visualization according to a first embodiment of the present invention.

Figure 13A:
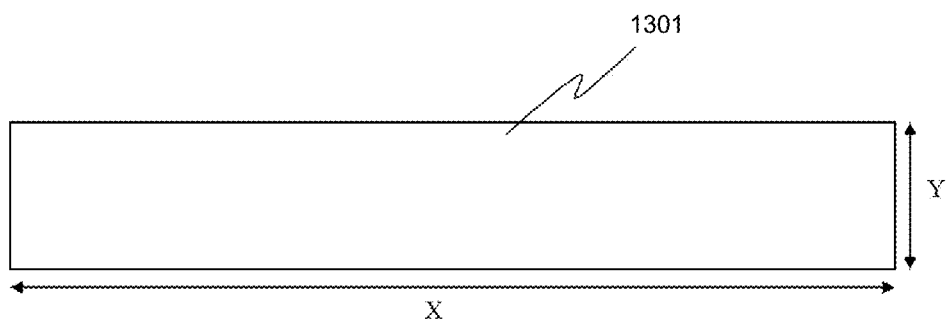
FIGS. 13A to 13G show the generation steps of a visualization according to an embodiment of the present invention.

Referring to FIG. 13A, a main bounding rectangle 1301 is generated having dimensions X and Y representing the width and height of the rectangle. According to this example, the width X is 150 units and the height is 25 units. Thus, the main bounding rectangle has a total of 3,750 data points that may be used to represent data values with the data sets.

Figure 13B:
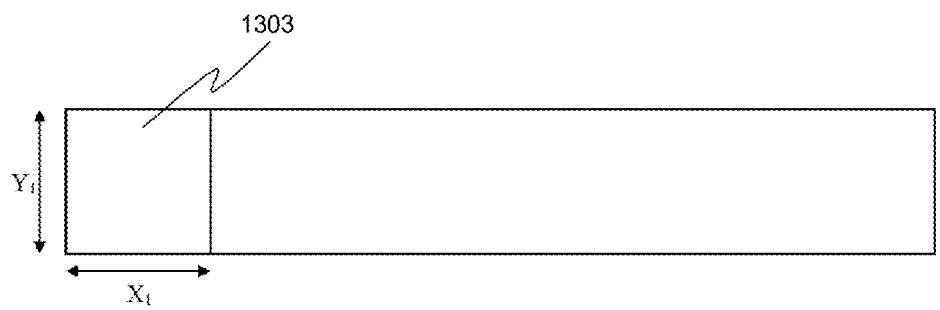

Referring to FIG. 13B, a group data set rectangle 1303 is generated and nested within the main bounding rectangle at one end of the main bounding rectangle. The group data set rectangle has dimensions $X_1$ and $Y_1$ representing the width and height of the rectangle. According to this example, the width $X_1$ is 25 units and the height $Y_1$ is 25 units. Thus, the group data set rectangle has a total of 625 data points that may be used to represent data values with the data sets.

Figure 13C:
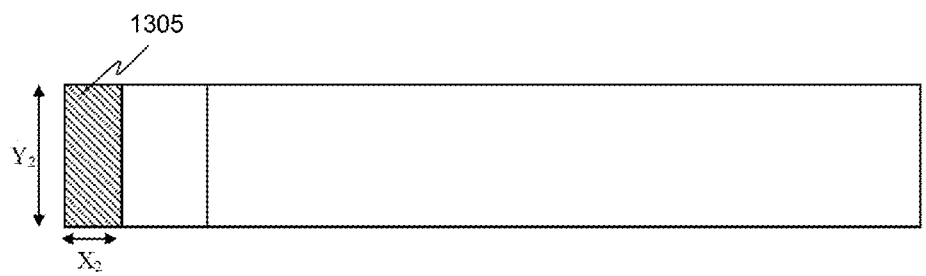

Referring to FIG. 13C, a first data set rectangle 1305 is generated and nested within the group data set rectangle 1303. The first data set rectangle 1305 is generated having dimensions $X_2$ and $Y_2$ representing the width and height of the rectangle. For example, the width $X_2$ may be 10 units and the height $Y_2$ may be 25 units such that the rectangle represents the data value of 250 for this data set. The height to width ratio of 2.5 determines the configuration of this rectangle. That is, the ratio of 2.5 is preconfigured as a preferred ratio. A tolerance value of may be provided to give some flexibility on the shape and configuration of each generated nested rectangle. The height of 25 units is chosen to fit in with the height of the main bounding rectangle (and group data set rectangle).

Referring to FIG. 3D, a second data set rectangle 1307 is initially generated for nesting within the group data set rectangle 1303. According to this embodiment, the initial orientation of the second data set rectangle is the same as the previous data set rectangle. That is, for each subsequent data set rectangle being generated the orientation is the same, unless it is determined that it should be changed. It will be understood that, as an alternative, the orientations may by default be switched, and only kept the same as the previously generated rectangle if the rectangle generation module determines that the orientation should be maintained.

The rectangle generation module initially determines that the data set rectangle 1307 would be generated having dimensions $X_3$ and $Y_3$ representing the width and height of the rectangle. The rectangle generation module determines how the rectangle 1307 would be positioned if it were adjacent the previously generated rectangle in the same orientation as the previous rectangle. However, the rectangle generation module further determines that this positioning does not use all the available space along the neighboring boundary with the previously generated rectangle thus leaving a space below the new rectangle 1307. It is desirable not to have any free space with the group data set rectangle 1303 as this can affect the interpretation of the data.

Therefore, according to one example, the rectangle generation module determines whether that the next rectangle must either fill in the available space from top to bottom, or from left to right, and if not, the orientation of the rectangle is adjusted.

According to a further example, the rectangle generation module determines the orientation of the rectangle based on which ratio is closest to the predetermined ratio. That is, the rectangle generation module determines the ratio of the rectangle if it were to be positioned in a first orientation, and then determines the ratio of the rectangle if it were to be positioned in a second orientation. A comparison of these two ratios against the predetermined ratio value is carried out to determine the closest ratio value. The orientation that has the closest ratio value is used by the rectangle generation module to generate and position the rectangle.

Figure 13D:
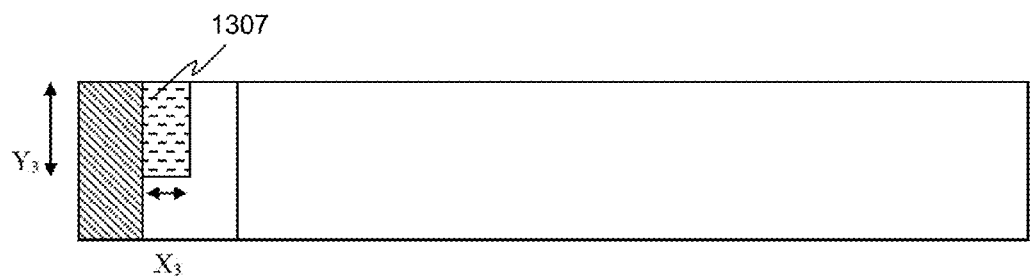

As can be seen in FIG. 13D, the data set rectangle 1307 initially has dimensions $X_3$ and $Y_3$ representing the width and height of the rectangle having a ratio of 2.5. This leaves a gap below the rectangle 1307. Whereas, if the rectangle is re-orientated as shown in FIG. 13E, no gap exists and the rectangle fits in the available area with the adjusted dimensions $X_{3'}$ and $Y_{3'}$.

Figure 13E:
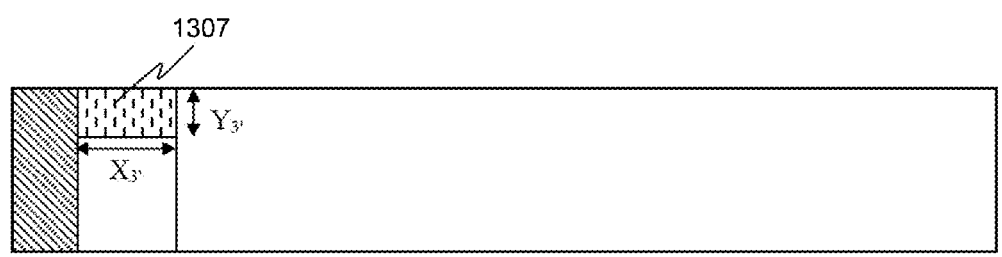
Figure 13F:
Figure 13G:
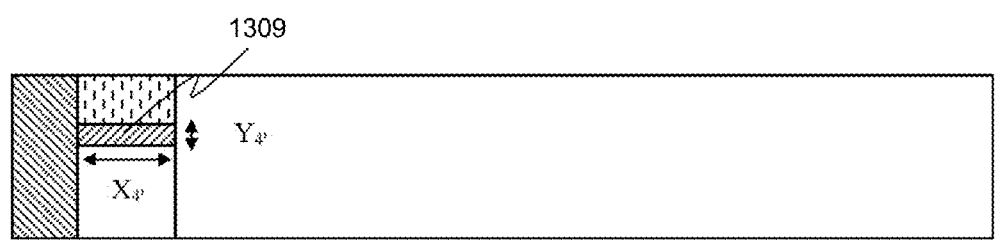

As can be seen in FIG. 13E, the data set rectangle 1309 initially has dimensions $X_4$ and $Y_4$ representing the width and height of the rectangle having a ratio of 2.5. This leaves a gap to the right of the rectangle 1307. Whereas, upon the rectangle generation module determining that the closest ratio to the predetermined value (2.5) for the rectangle is when the rectangle remains in its current orientation, as shown in FIG. 13E, the dimensions are adjusted to $X_{4'}$ and $Y_{4'}$.

Therefore, the system provides an efficient computational method of generating a tree map. The improved efficiency comes about by having a system which is only required to look once at the data associated with a data set rectangle being generated.

It will be understood that the embodiments of the present invention described herein are by way of example only, and that various changes and modifications may be made without departing from the scope of invention.

I claim:

1. A data visualization system comprising:
   a data retrieval module arranged to retrieve data from a data storage module in communication with the data visualization system, wherein the retrieved data includes data sets for representation in a tree map;
   a tree map generation module arranged to generate a tree map based on the retrieved data, wherein the tree map generation module is further arranged to:
   i) sort the retrieved data sets according to the size of the data sets;
   ii) define an area for generating multiple rectangles, each rectangle representing one of the data sets, wherein the area is defined to allow the data sets to be spatially arranged within the area;
   iii) accumulate data points for data within the data sets to generate a rectangle that has dimensions that fall within pre-defined parameters;
   iv) generate a rectangle for each data set; and
   v) orientate the rectangle while maintaining the area of the rectangle such that its orientation is only changed if the rectangle does not fit in the available area.

2. The system of claim 1, wherein the tree map generation module is further arranged to determine a total number of data points for all data sets being represented in the tree map.

3. The system of claim 1, wherein the tree map generation module is further arranged to determine a number of set data points for each data set being represented in the tree map.

4. The system of claim 1, wherein the tree map generation module is further arranged to arrange or sort data within each data set into data elements in a hierarchical order.

5. The system of claim 1, wherein the tree map generation module is further arranged to determine a number of data element data points for each data element at each hierarchical level in the hierarchical order within each data set.

6. The system of claim 1, wherein the tree map generation module is further arranged to define a bounding rectangle based on the total number of data points in all data sets, wherein the bounding rectangle is defined as having a determined size that accommodates the total number of data points and a determined ratio that falls within a pre-defined width: length ratio for bounding rectangles.

7. The system of claim 1, wherein the tree map generation module is further arranged to define a first data set rectangle based on all data points in a first data set, wherein the first data set rectangle is defined as having a determined size that accommodates the total number of data points in the first data set and a determined ratio that falls within a pre-defined width:length ratio for data set rectangles.

8. The system of claim 1, wherein the tree map generation module is further arranged to define a first data rectangle based on the data element data points for a first data element that is at the highest hierarchical level, wherein the first data rectangle is defined as having a determined size that accommodates the total number of data element data points for the first data element and a determined ratio that falls within a pre-defined width:length ratio for data rectangles.

9. The system of claim 1, wherein the tree map generation module is further arranged to define a subsequent data rectangle based on data element data points for a subsequent data element that is one hierarchical level below the hierarchical level of the previously defined data rectangle, wherein the subsequent data rectangle is defined as having a determined size that accommodates the total number of data element data points for the subsequent data element and a determined ratio that falls within a pre-defined width:length ratio for data rectangles.

10. The system of claim 1, wherein the orientation of the first or subsequent data rectangles is determined by whether the first or subsequent data rectangle fits within space available within the data set rectangle.

11. The system of claim 10, wherein a first orientation associated with the previous data rectangle is maintained in the subsequent rectangle if the subsequent rectangle fits within the space available using the first orientation.

12. The system of claim 10, wherein a second orientation opposite to a first orientation associated with the previous data rectangle is used in the subsequent rectangle if the subsequent rectangle does not fit within the space available using the first orientation.

13. The system of claim 1, wherein the tree map generation module is further arranged to position the first data rectangle in the data set rectangle so that it is positioned such that two perpendicular sides of the data rectangle are aligned with two perpendicular sides of the data set rectangle.

14. The system of claim 1, wherein the tree map generation module is further arranged to position the subsequent data rectangle in space that remains in the data set rectangle after placement of the previous data rectangle so that two perpendicular sides of the subsequent data rectangle are aligned with two perpendicular sides of the remaining space.

15. The system of claim 1, wherein the tree map generation module is further arranged to position the first and subsequent data rectangles in the data set rectangle so that space that remains in the data set rectangle after placement has a rectangular shape.

16. A data visualization computer implemented method comprising the steps of a processor:
retrieving data from a data storage module in communication with a data visualization system, wherein the retrieved data includes data sets for representation in a tree map; and
generating a tree map based on the retrieved data, wherein the tree map generation further comprises the steps of:
i) sorting the retrieved data sets according to the size of the data sets;
ii) defining an area for generating multiple rectangles, each rectangle representing one of the data sets, wherein the area is defined to allow the data sets to be spatially arranged within the area;
iii) accumulating data points for data within the data sets to generate a rectangle that has dimensions that fall within pre-defined parameters;
iv) generating a rectangle for each data set; and
v) orientating the rectangle while maintaining the area of the rectangle such that its orientation is only changed if the rectangle does not fit in the available area.

17. The method of claim 16, further comprising the step of determining a total number of data points for all data sets being represented in the tree map.

18. The method of claim 16, further comprising the step of determining a number of set data points for each data set being represented in the tree map.

19. The method of claim 16, further comprising the step of arranging or sorting data within each data set into data elements in a hierarchical order.

20. The method of claim 16, further comprising the step of determining a number of data element data points for each data element at each hierarchical level in the hierarchical order within each data set.

21. The method of claim 16, further comprising the step of defining a bounding rectangle based on the total number of data points in all data sets, wherein the bounding rectangle is defined as having a determined size that accommodates the total number of data points and a determined ratio that falls within a pre-defined width:length ratio for bounding rectangles.

22. The method of claim 16, further comprising the step of defining a first data set rectangle based on all data points in a first data set, wherein the first data set rectangle is defined as having a determined size that accommodates the total number of data points in the first data set and a determined ratio that falls within a pre-defined width:length ratio for data set rectangles.

23. The method of claim 16, further comprising the step of defining a first data rectangle based on the data element data points for a first data element that is at the highest hierarchical level, wherein the first data rectangle is defined as having a determined size that accommodates the total number of data element data points for the first data element and a determined ratio that falls within a pre-defined width:length ratio for data rectangles.

24. The method of claim 16, further comprising the step of defining a subsequent data rectangle based on data element data points for a subsequent data element that is one hierarchical level below the hierarchical level of the previously defined data rectangle, wherein the subsequent data rectangle is defined as having a determined size that accommodates the total number of data element data points for the subsequent data element and a determined ratio that falls within a pre-defined width:length ratio for data rectangles.

25. The method of claim 16, wherein the orientation of the first or subsequent data rectangles is determined by whether the first or subsequent data rectangle fits within space available within the data set rectangle.

26. The method of claim 25, wherein a first orientation associated with the previous data rectangle is maintained in the subsequent rectangle if the subsequent rectangle fits within the space available using the first orientation.

27. The method of claim 25, wherein a second orientation opposite to a first orientation associated with the previous data rectangle is used in the subsequent rectangle if the subsequent rectangle does not fit within the space available using the first orientation.

28. The method of claim 16, further comprising the step of positioning the first data rectangle in the data set rectangle so that it is positioned such that two perpendicular sides of the data rectangle are aligned with two perpendicular sides of the data set rectangle.

29. The method of claim 16, further comprising the step of positioning the subsequent data rectangle in space that remains in the data set rectangle after placement of the previous data rectangle so that two perpendicular sides of the subsequent data rectangle are aligned with two perpendicular sides of the remaining space.

30. The method of claim 16, further comprising the step of positioning the first and subsequent data rectangles in the data set rectangle so that space that remains in the data set rectangle after placement has a rectangular shape.

* * * * *